US008559676B2

(12) United States Patent
Hildreth

(10) Patent No.: US 8,559,676 B2
(45) Date of Patent: Oct. 15, 2013

(54) MANIPULATION OF VIRTUAL OBJECTS USING ENHANCED INTERACTIVE SYSTEM

(75) Inventor: Evan Hildreth, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 1103 days.

(21) Appl. No.: 11/965,332

(22) Filed: Dec. 27, 2007

(65) Prior Publication Data
US 2008/0166022 A1 Jul. 10, 2008

Related U.S. Application Data

(60) Provisional application No. 60/882,849, filed on Dec. 29, 2006.

(51) Int. Cl.
*G06K 9/00* (2006.01)
(52) U.S. Cl.
USPC .......................................... 382/107
(58) Field of Classification Search
USPC ........... 382/106, 107, 110; 345/156, 426, 423
See application file for complete search history.

(56) References Cited

U.S. PATENT DOCUMENTS

| 4,746,770 | A | 5/1988 | McAvinney |
| 5,164,992 | A | 11/1992 | Turk et al. |
| 5,435,554 | A | 7/1995 | Lipson |
| 5,483,261 | A | 1/1996 | Yasutake |
| 5,528,263 | A | 6/1996 | Platzker |
| 5,534,917 | A | 7/1996 | MacDougall |
| 5,710,833 | A | 1/1998 | Moghaddam et al. |
| 5,808,678 | A | 9/1998 | Sakaegi |
| 5,818,421 | A | 10/1998 | Ogino et al. |
| 5,846,134 | A | 12/1998 | Latypov |
| 5,982,352 | A | 11/1999 | Pryor |
| 6,008,800 | A | 12/1999 | Pryor |
| 6,072,496 | A | 6/2000 | Guenter et al. |
| 6,075,905 | A | 6/2000 | Herman et al. |
| 6,100,538 | A | 8/2000 | Ogawa |
| 6,222,465 | B1 * | 4/2001 | Kumar et al. .................. 341/20 |
| 6,275,214 | B1 | 8/2001 | Hansen |

(Continued)

FOREIGN PATENT DOCUMENTS

| CN | 1193394 A | 9/1998 |
| JP | 2003091740 A | 3/2003 |

(Continued)

OTHER PUBLICATIONS

Galvin, B., et al., "Recovering Motion Fields: An Evaluation of Eight Optical Flow Algorithms", British Machine Vision Conference (1998), pp. 195-204.

(Continued)

*Primary Examiner* — Nancy Bitar
(74) *Attorney, Agent, or Firm* — Kilpatrick Townsend & Stockton LLP

(57) ABSTRACT

The detection of motion of a user via a camera and the generation of a dynamic virtual representation of a user on a display, where the user's detected motion causes the dynamic virtual representation to interact with virtual objects on the display. The magnitude and direction of the user's detected motion is calculated to determine the magnitude and direction of a force applied by the dynamic virtual representation to the virtual object. Further arrangements include water or smoke fluid simulations, in order to enhance the user experience.

35 Claims, 21 Drawing Sheets

(56) References Cited

U.S. PATENT DOCUMENTS

| | | | |
|---|---|---|---|
| 6,377,700 B1 | 4/2002 | Mack et al. | |
| 6,535,114 B1 | 3/2003 | Suzuki et al. | |
| 6,628,819 B1 | 9/2003 | Huang et al. | |
| 6,640,145 B2 | 10/2003 | Hoffberg et al. | |
| 6,683,677 B2 | 1/2004 | Chon et al. | |
| RE38,420 E | 2/2004 | Thomas | |
| 6,720,949 B1 | 4/2004 | Pryor et al. | |
| 6,760,009 B2 | 7/2004 | Omura et al. | |
| 6,762,747 B2 | 7/2004 | Fujioka et al. | |
| 6,791,531 B1 | 9/2004 | Johnston et al. | |
| 6,803,906 B1 | 10/2004 | Morrison et al. | |
| 6,858,003 B2* | 2/2005 | Evans et al. | 600/103 |
| 6,956,576 B1* | 10/2005 | Deering et al. | 345/475 |
| 7,015,950 B1 | 3/2006 | Pryor | |
| 7,170,492 B2 | 1/2007 | Bell | |
| 7,187,412 B1 | 3/2007 | Silverstein | |
| 7,227,526 B2* | 6/2007 | Hildreth et al. | 345/156 |
| 7,570,250 B2* | 8/2009 | Tseng | 345/167 |
| 7,864,168 B2* | 1/2011 | French | 345/204 |
| 8,243,987 B2* | 8/2012 | Hampapur et al. | 382/103 |
| 8,280,115 B2* | 10/2012 | Matsumura et al. | 382/107 |
| 2001/0013950 A1 | 8/2001 | Pornbacher | |
| 2002/0153188 A1 | 10/2002 | Brandt et al. | |
| 2002/0186221 A1 | 12/2002 | Bell | |
| 2003/0098841 A1 | 5/2003 | Broussard | |
| 2004/0179728 A1 | 9/2004 | Littlefield et al. | |
| 2004/0183775 A1 | 9/2004 | Bell | |
| 2004/0189720 A1 | 9/2004 | Wilson et al. | |
| 2004/0193413 A1 | 9/2004 | Wilson et al. | |
| 2004/0228519 A1 | 11/2004 | Littlefield et al. | |
| 2004/0246333 A1 | 12/2004 | Steuart, III | |
| 2004/0257452 A1 | 12/2004 | Chang et al. | |
| 2005/0088407 A1 | 4/2005 | Bell et al. | |
| 2005/0089194 A1 | 4/2005 | Bell | |
| 2005/0110875 A1 | 5/2005 | Ma et al. | |
| 2005/0110964 A1 | 5/2005 | Bell et al. | |
| 2005/0122308 A1 | 6/2005 | Bell et al. | |
| 2005/0150122 A1 | 7/2005 | Cho et al. | |
| 2005/0162381 A1 | 7/2005 | Bell et al. | |
| 2006/0018516 A1* | 1/2006 | Masoud et al. | 382/115 |
| 2006/0132432 A1 | 6/2006 | Bell | |
| 2006/0139314 A1 | 6/2006 | Bell | |
| 2006/0192782 A1 | 8/2006 | Hildreth | |
| 2006/0209019 A1* | 9/2006 | Hu | 345/156 |
| 2006/0221072 A1 | 10/2006 | Se et al. | |
| 2007/0279485 A1* | 12/2007 | Ohba et al. | 348/41 |

FOREIGN PATENT DOCUMENTS

| | | | |
|---|---|---|---|
| JP | 2004246578 | A | 9/2004 |
| JP | 2005216061 | A | 8/2005 |
| WO | 0207839 | A2 | 1/2002 |
| WO | 2006108279 | A1 | 10/2006 |

OTHER PUBLICATIONS

Horn, Berthold K. P., et al., "Determining Optical Flow", Artificial Intelligence 17 (1981), pp. 185-203.

Lucas, Bruce D., et al, "An Iterative Image Registration Technique with an Application to Stereo Vision", From Proceedings of Imaging Understanding Workshop, (1981), pp. 121-129.

May, Richard Allen, "Toward Directly Mediated Interaction in Computer Supported Environments", Ph.D. Thesis, University of Washington (2004), pp. 1-182.

SIGGRAPH, http://www.siggraph.org/~fujii/etech/2000_281.html, Emerging Technologies 1991-2002, Mar. 24, 2006, 2 pages.

Wellner, Pierre, "Interacting with Paper on the Digital Desk", Communications of the ACM, vol. 36, No. 7, (Jul. 1993), pp. 87-96.

"Smile! You're on Xbox Live Vision!," http://www.xbox.com/en-US/community/personality/elle/20060915-xboxlivevision.htm, Xbox.com, (Sep. 15, 2006), 5 pages.

Lynch, Steve, "Xbox Live Vision," http://www.hardocp.com/article.html?art=MTE5OSwsLGhjb25zb2x1, (Oct. 23, 2006), 7 pages.

Ho-Kuen Shin et al., 'Real-time gesture recognition using 3D motion history model', ICIC, Jan. 1, 2005, pp. 888-898.

Davis, et al., 'The representation and recognition of human movement using temporal templates', IEEE, Jun. 6, 1997, pp. 928-934.

Supplementary European Search Report in Application No. 07869959.2 mailed Nov. 25, 2010, 5 pages.

Bradski, et al., 'Motion segmentation and pose recognition with motion history gradients', Machine Vision and Applications, vol. 13, No. 3, Jul. 31, 2002, pp. 174-184.

Davis et al., 'Hierarchial motion history images for recognizing human motion', IEEE, Jul. 8, 2001, pp. 39-46.

Ogata et al., 'Real time human motion recognition based on a motion history image and an eigenspace', vol. 2, No. 4, IEEE, Aug. 4, 2004, pp. 1901-1902.

International Search Report and Written Opinion—PCT/US2007/088913—ISA/EPO—Jun. 18, 2008.

Koizumi S., et al., "Concept of Pseudo After Image and its Application to Moving Objects Detection," The Journal of Japan Society for Fuzzy Theory and Intelligent Informatics, Jun. 15, 2000, vol. 12 (3), pp. 417-424.

Takematsu K., et al., "Real-Time Human Body Posture Estimation by Extracting Motion Vectors from Echo-Image," Technical Report of The Institute of Electronics, Information and Communication Engineer MVE, Japan, Mar. 22, 2000, vol. 99 (723), pp. 93-98.

European Search Report—EP13150556—Search Authority—Munich—Jun. 10, 2013.

* cited by examiner

| Frame Count | Alpha |
|---|---|
| 0 | 100% |
| 1 | 90% |
| 2 | 80% |
| 3 | 70% |
| 4 | 60% |
| 5 | 50% |
| 6 | 40% |
| 7 | 30% |
| 8 | 20% |
| 9 | 10% |
| 10 or larger | 0% |

FIG. 23

MANIPULATION OF VIRTUAL OBJECTS USING ENHANCED INTERACTIVE SYSTEM

CROSS-REFERENCE TO RELATED APPLICATIONS

This application claims the benefit of U.S. Provisional Application No. 60/882,849, filed Dec. 29, 2006, which is incorporated by reference.

FIELD

This application generally relates to motion detection, and at least one particular arrangement relates to providing interaction between a representation of a user and an object on a display.

BACKGROUND

Cameras have been used to capture images of objects. Techniques have been developed to analyze one or more images of an object present within the one or more images to detect a position of the object. For example, optical flow has been used to detect motion of an object by analyzing multiple images of the object taken successively in time.

SUMMARY

According to one general implementation, at least a first image of an object is received and the object is detected in the first image. An object data map is generated based on detection of the object in the first image. The object data map indicates, for each pixel in the first image, whether the object is detected at the each pixel. A motion history is generated. The motion history indicates, for each pixel included in the object data map, an indication of time since the object has been detected at the each pixel. An application is controlled based on the motion history.

Implementations may include one or more of the following features. For example, the motion history may indicate, for each pixel included in the object data map, an opacity value corresponding to the time since the object has been detected at the each pixel. The motion history also may indicate, for each pixel included in the object data map, a number of frames since the object has been detected at the each pixel. The motion history further may indicate, for each pixel included in the object data map, a measurement of time since the object has been detected at the each pixel.

In some implementations, the motion history may be generated by accessing a prior motion history and updating the prior motion history based on the object data map. The prior motion history may have been generated based on images of the object received prior to the first image. The prior motion history may be updated based on the object data map by setting, for each pixel in the first image at which the object has been detected, the indication of time since the object has been detected as an indication of time indicating that the object has been most recently detected at the pixel and aging, for each pixel in the first image at which the object has not been detected, the indication of time since the object has been detected.

The indication of time since the object has been detected may be aged by updating the indication of time since the object has been detected to indicate that the time since the object has been detected has increased. The indication of time since the object has been detected also may be aged by determining, for each pixel in the first image at which the object has not been detected, whether the indication of time since the object has been detected in the prior motion history is more than a threshold amount of time. The indication of time since the object has been detected may be updated to indicate that the time since the object has been detected has increased conditioned on determining that the indication of time since the object has been detected in the prior motion history is not more than the threshold amount of time. The indication of time since the object has been detected may be maintained conditioned on determining that the indication of time since the object has been detected in the prior motion history is more than the threshold amount of time.

In some implementations, the motion history may be filtered and the application may be controlled based on the filtered motion history. The motion history may be filtered by, for each pixel, computing a value for the each pixel based on a value of the each pixel and values of pixels neighboring the each pixel.

In some examples, at least a first image of a user may be received. The application may be controlled by displaying a representation of the object in a display image associated with the application. Movement of the representation of the object in the display image associated with the application may be controlled. The representation of the object in the display image associated with the application may be displayed as one or more particles of a particle system. The representation of the object in the display image associated with the application may be displayed by generating an outline contour representing motion of the object based on the motion history and determining whether the representation of the object in the display image touches a virtual object rendered in the display image by the application based on the generated outline contour.

In some implementations, the representation of the object in the display image associated with the application may be displayed such that pixels corresponding to pixels in the motion history at which the indication of time indicates the object has been most recently detected are displayed with an opacity greater than pixels corresponding to pixels in the motion history at which the indication of time indicates the object has been detected further in the past. For instance, a representation of the object may be displayed such that pixels corresponding to pixels in the motion history are displayed with an opacity based on the indication of time associated with the pixel. A representation of the object also may be displayed such that a first pixel associated with an indication of time that indicates that the object has been detected more recently at the first pixel than a second pixel appears with an opacity that is greater than an opacity of the second pixel.

In further examples, a representation of the object may be displayed in a display image associated with the application by generating an alpha channel based on the motion history and displaying a representation of the object in the display image based on the alpha channel. An effect image may be displayed. The effect image may be an animated effect image based on an animation or a particle system and the animated effect image, may represent one of water ripples, plasma, fire, or smoke. A keyed image of the object also may be displayed;

Additionally, whether the representation of the object in the display image touches a virtual object rendered in the display image by the application may be determined based on the motion history and the application may be controlled based on determination results. The virtual object may be at least one of a button, a ball, or a particle, in a particle system. A velocity for the virtual object may be calculated based on the motion history and the application may be controlled based on the determined velocity for the virtual object. The velocity may be calculated by calculating a velocity and a direction of motion for the virtual object based on optical flow data associated with the motion history and the application may be controlled based on the determined velocity and the determined direction of motion for the virtual object. The virtual object may be a particle of a particle system.

Also, multiple images of the object including the first image may be received and motion of the object may be determined based on the multiple images. The object may be detected in the first image by comparing the first image with a background image.

According to another general implementation, images including at least a first image of a user and a second image of the user are received. The second image of the user was captured after the first image of the user and the second image is compared to the first image. Motion in the images is detected based on the comparison of the second image to the first image and a position of the user in the second image is determined based on the detected motion in the images. A user data map is generated in response to determining the position of the user in the second image. The user data map corresponds to the pixels included in the second image and indicates the position of the user in the second image. A prior motion history of the user is accessed. The prior motion history indicates, for each pixel included in the user data map, an indication of time since the user has been detected at a position corresponding to the pixel and the prior motion history was generated based on images of the user received prior to the second image. The prior motion history is aged by incrementing, for each pixel included in the prior motion history, the indication of time since the user has been detected at the position corresponding to the pixel. The aged motion history is updated based on the user data map by setting, for each pixel included in the user data map at which the position of the user has been detected, a corresponding pixel in the aged motion history to an indication of time indicating that the position of the user is currently detected at the pixel. A representation of the user is displayed in a display image associated with an application based on the updated motion history such that an opacity of pixels associated with the representation of the user in the display image is based on the indication of time since the user has been detected at the position corresponding to the pixel included in the updated motion history.

According to another general implementation, A system includes a camera configured to capture at least a first image of an object and a processor configured to receive the first image of the object from the camera. The processor also is configured to detect the object in the first image and generate an object data map in response to detecting the object in the first image. The object data map indicates, for each pixel in the first image, whether the object is detected at the each pixel. The processor further is configured to generate a motion history and control an application based on the motion history. The motion history indicates, for each pixel included in the object data map, an indication of time since the object has been detected at the each pixel. The system also includes a display configured to render a display image associated with the application.

According to another general implementation, a computer readable storage medium has embodied thereon a computer program. The computer program includes instructions for receiving at least a first image of an object and detecting the object in the first image. The computer program also includes instructions for generating an object data map in response to detecting the object in the first image. The object data map indicates, for each pixel in the first image, whether the object is detected at the each pixel. The computer program further includes instructions for generating a motion history and controlling an application based on the motion history. The motion history indicates for each pixel included in the object data map, an indication of time since the object has been detected at the each pixel.

According to another general implementation, a system includes means for receiving at least a first image of an object and means for detecting the object in the first image. The system also includes means for generating an object data map in response to detecting the object in the first image. The object data map indicates, for each pixel in the first image, whether the object is detected at the each pixel. The system further includes means for generating a motion history and means for controlling an application based on the motion history. The motion history indicates, for each pixel included in the object data map, an indication of time since the object has been detected at the each pixel.

This brief summary has been provided to enable a quick understanding of various concepts and implementations described by this document. A more complete understanding can be obtained by reference to the following detailed description in connection with the attached drawings. It is to be understood that other implementations may be utilized and changes may be made.

BRIEF DESCRIPTION OF THE DRAWINGS

FIG. 23 illustrates an example of a mapping process.

Like reference numbers represent corresponding parts throughout.

DETAILED DESCRIPTION

Figure 1:
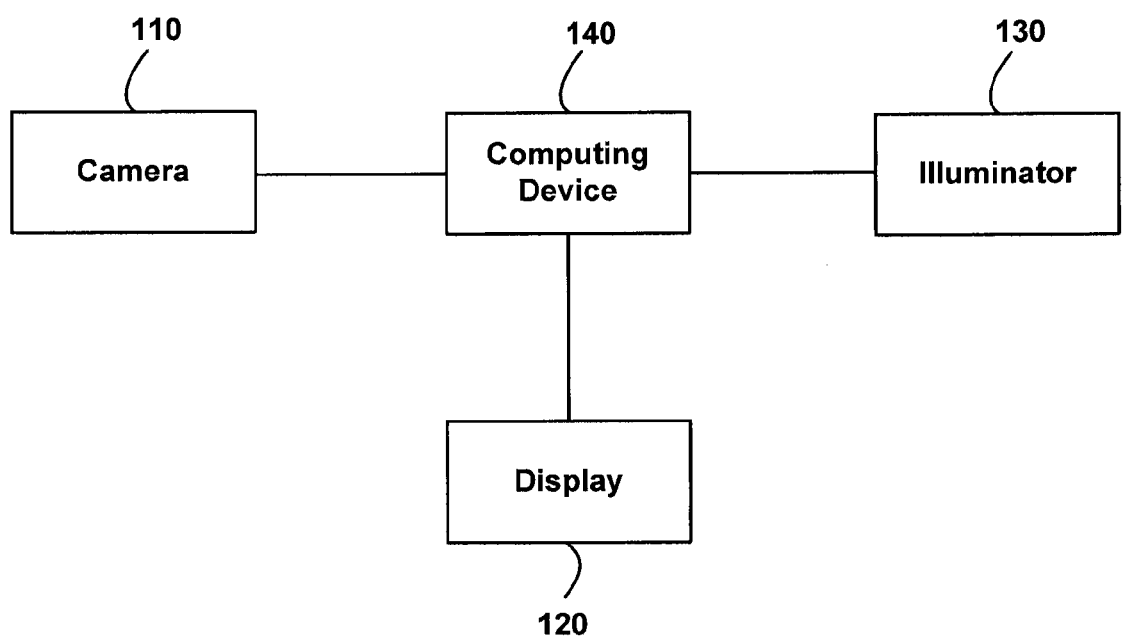
FIG. 1 is a block diagram illustrating an example of a system configured to control an application based on motion history.

FIG. 1 illustrates an example of a system 100 configured to control an application based on motion history. The system 100 includes a camera 110, a display device 120, an illuminator 130, and a computing device 140.

The camera 110 is a device that captures images. For example, the camera 110 may be a digital camera, a digital video camera, or any other type of device that captures images. The camera 110 may include one or more cameras. The camera 110 may capture images of an object interacting with an application. For instance, the camera 110 may capture images of a user or person physically interacting with an application within the field of view of the camera 110.

The display device 120 renders a visual display image. For example, the display device 120 may be a monitor, a television, a liquid crystal display (LCD), a plasma display device, a projector with a projector screen, an auto-stereoscopic display, a cathode ray tube (CRT) display, a digital light processing (DLP) display, or any other type of display device configured to render a visual display image. The display device 120 may include one or more display devices. The display device 120 may display images associated with an application. For instance, the display device 120 may render display images generated by an application. The display images generated by the application may include a representation of a user or person physically interacting with the application based on images captured by the camera 110.

The illuminator 130 is a device that provides a light source. For example, the illuminator 130 may be a flash device, an incandescent light bulb, a fluorescent light bulb, a light emitting diode (LED), a halogen light source, a neon light source, a xenon light source, an infrared light source, or any other type of device configured to illuminate an object being imaged by the camera 110. The illuminator 130 may include one or more illuminators. The illuminator 130 may generate light to assist in capturing a high quality image of an object being captured by the camera 110. In some implementations, the system 100 may not include the illuminator 130 or the illuminator 130 may only be used in particular situations. For instance, the illuminator 130 may only be used at nighttime or in dark rooms.

The computing device 140 is electrically connected, over a wired or wireless pathway, to the camera 110, the display device 120, and the illuminator 130 and may control operation of the system 100. In some examples, the computing device 140 may include a processor or other control circuitry configured to execute an application. In these examples, the computing device 140 may receive images captured by the camera 110 and process the received images to detect a position of an object (e.g., a user) within the images. The detected position of the object within the images may be tracked and used to control execution of the application. For instance, the application being executed by the computing device 140 may generate a display image including a representation of the object based on the tracked position of the object within the images or may generate a user input command or another type of user interaction based on the tracked position of the object within the images.

The computing device 140 also may control operation and settings of the camera 110, the display device 120, and the illuminator 130. The computing device 140 may be a general purpose computer (e.g., a desktop personal computer, a workstation, or a laptop computer), a server, a gaming device or console, or any other type of electronic device that includes a processor or other control circuitry configured to execute instructions.

Figure 2:
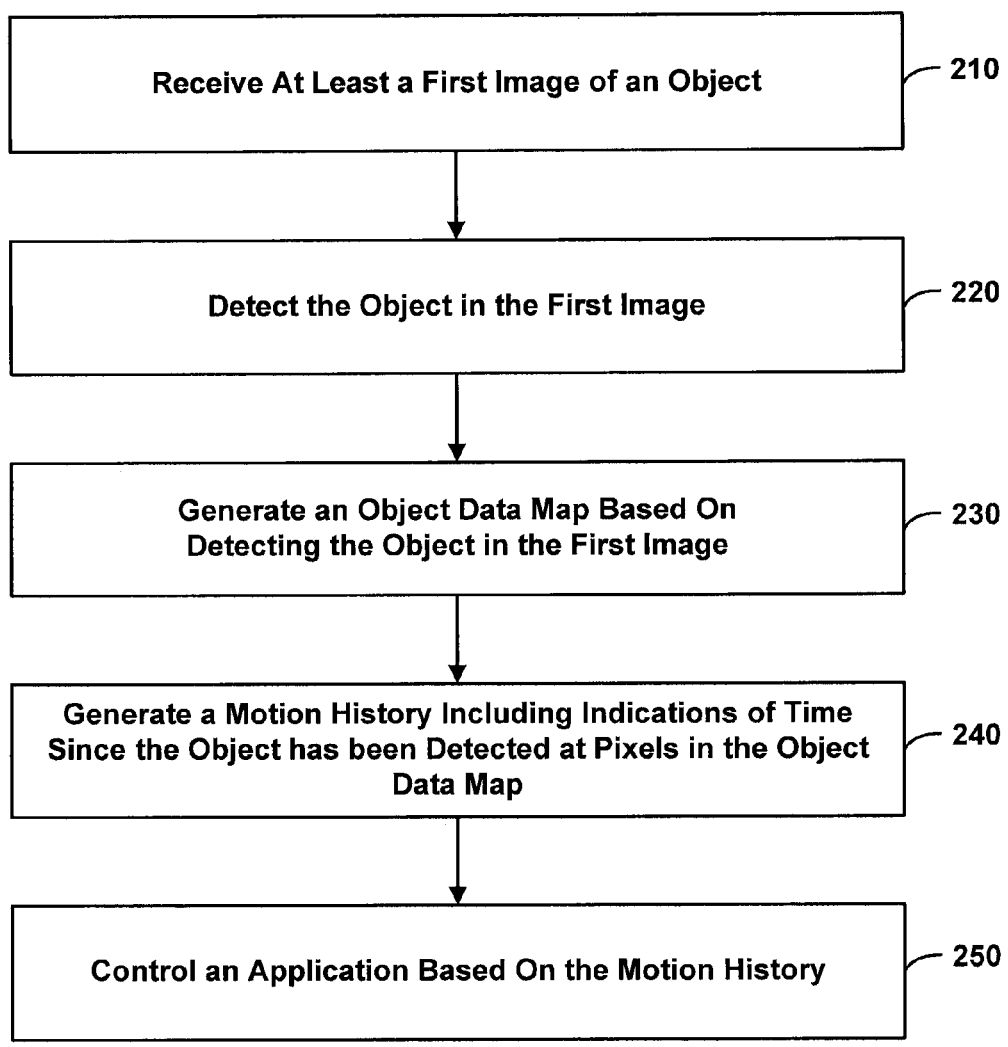
FIG. 2 is a flow chart illustrating an example of a process for controlling an application based on motion history.

FIG. 2 is a flow chart illustrating an example of a process 200 for controlling an application based on motion history. For convenience, particular components described with respect to FIG. 1 are referenced as performing the process 200. However, similar methodologies may be applied in other implementations where different components are used to define the structure of the system, or where the functionality is distributed differently among the components.

The computing device 140 receives at least a first image of an object (210). For example, the computing device 140 receives one or more images captured by the camera 110. In this example, the one or more images captured by the camera 110 may be images of an object (e.g., a user or an object being manipulated by a user) interacting with an application. The application may be an application being executed by the computing device 140 and the application may generate display images, for display on the display device 120. The object (e.g., the user or the object being manipulated by the user) may interact with the application based on the images displayed on the display device 120.

The computing device 140 detects an object in the first image (220). For example, the computing device 140 may process or analyze the first image to detect a position of an object included in the first image. In this example, the computing device 140 may use any type of technique to detect an object within a single image or within a set of multiple images of the object. The computing device 140 may detect and track motion of an object throughout a series of images captured successively in time.

The computing device 140 may use a variety of techniques to detect an object in the first image (220). For example, the processes described with respect to FIGS. 3-7 represent processes that the computing device 140 may use to detect an object in the first image (220).

Figure 3:
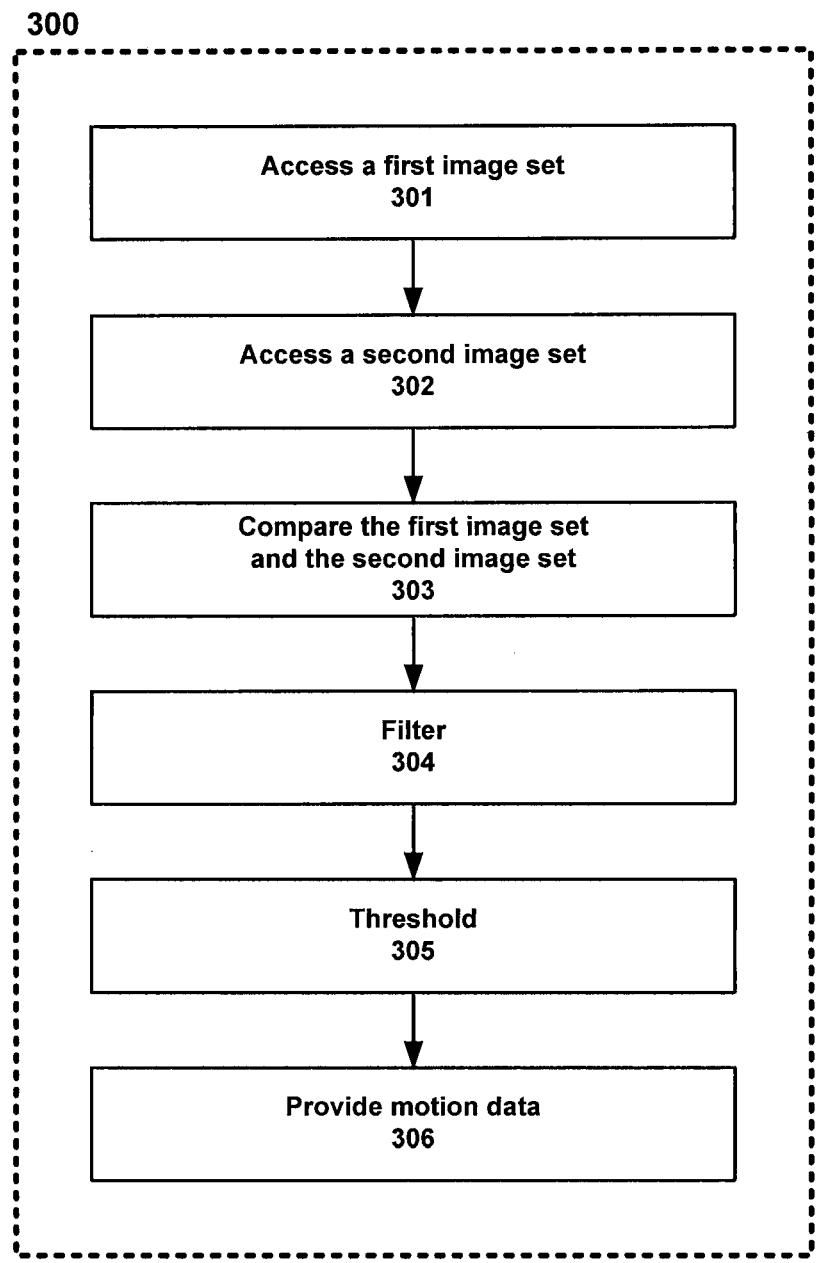
FIGS. 3 to 5 are flowcharts illustrating examples of processes for detecting an object in an image.

FIG. 3 illustrates an example of a process 300 for detecting an object in an image. The process 300 for detecting an object in an image may be used in detecting an object in the first image (220) in performing process 200.

The process 300 includes accessing a first image set (301) and accessing a second image set (302). For example, the computing device 140 accesses a first image set including one or more images captured by the camera 110 and accesses a second image set including one or more images captured by the camera 110. The first image set and second image set may represent consecutive processed camera images or may represent consecutive camera image sets that have not been processed.

In some implementations, the images included in the first image set and the second image set may be multi-buffered. In a multi-buffered image, an image may include multiple image buffers. The image buffers are filled in a circular fashion. For example, in a multi-buffered image with two image buffers, an image is written to the first image buffer and the next image is written to the second image buffer.

The following image (e.g., a third image) is written to the first image buffer, replacing the contents of the first image buffer. The next image (e.g., a fourth image) is written to the second image buffer, replacing the contents of the second image buffer. This process is repeated for additional images, such that the first and second image buffers contain a most recent image and a second most recent image. This process may improve system efficiency because image data is not unnecessarily copied. In implementations in which the camera 110 includes multiple cameras producing multiple images, the first image set may include images from multiple cameras, and the second image set may include images from multiple cameras.

The computing device 140 compares the first image set and the second image set (303). For example, the computing device 140 may compare the first image set and the second image set to produce a value used to detect motion of an object captured in the image sets. In this example, the computing device may compute a difference (e.g., absolute difference) between one or more images included in the first image set and one or more images included in the second image set. The computed difference may be used by the computing device 140 to detect motion of an object throughout the images included in the first image set and the second image set.

The image sets may contain multiple channels, as in the case of color images. A pixel value may include the data values of multiple channels. It may be that the difference calculation (e.g., absolute difference) is calculated for each channel, and the result combined. The image sets may contain data from multiple carriers. A pixel value may include data values from multiple cameras. It may be that the difference calculation (e.g., absolute difference) is calculated for each camera's pixel data, and the result combined. The image sets may contain data from multiple camera exposure levels. A pixel value may include data values from multiple exposure levels. It may be that the difference calculation (e.g., absolute difference) is calculated for each exposure level's pixel data, and the result combined.

A process of combining a result includes calculating the sum of the various parts. An alternative process of combining a result includes selecting the maximum of the various parts. A further process of combining a result includes selecting the result that is generated from a predetermined part (e.g., channel, image, or exposure) of the image set.

The computing device 140 processes the difference results using a filtering operation (304). The filtering operation may be an averaging kernel. In one implementation of the filtering operation, for each pixel, the sum may be calculated for all the pixels within a neighborhood centered on that pixel. An averaging kernel may be used for blurring an image. In this implementation, the operation may have the following effects. A pixel's difference may be strengthened or weakened by its neighboring pixels. Isolated pixels with large difference values may be suppressed. Also, clusters of pixels having relatively small difference values may be re-enforced, and the shape of clusters may be smoothed.

The computing device 140 processes the filtered difference results using a threshold operation (305). The threshold operation may compare each pixel of the filtered difference results to a threshold value. If a pixel has a value larger than or equal to the threshold value, that pixel is classified as having motion, otherwise that pixel is classified as having no motion.

In performing the threshold operation (305), the computing device 140 may adjust the threshold value based on camera control data associated with the camera 110 used to capture the images included in the first image set and the second images set. The camera control data may cause a camera to capture images in such a way that consecutive camera images may contain a difference where there is no difference in the scene being captured (for example, when the camera exposure time or gain level is adjusted). The threshold operation may momentarily adjust the threshold value increasing it by the maximum expected difference in consecutive images where there is no difference in the scene being captured. This has the effect of reducing false-positive motion detection while a camera is being adjusted.

The computing device 140 provides the classification of pixels obtained in performing the threshold operation as motion data (306). The motion data may be used in controlling an application. For example, in implementations in which the motion data represents motion of an object (e.g., a user), a representation of the object (e.g., a user) may be displayed on the display device 120 as part of the application.

In addition to the process described with respect to FIG. 3, the computing device 140 may use other techniques to detect an object in the first image (220). For example, the processes described with respect to FIGS. 4-7 represent additional processes the computing device 140 may use to detect an object in the first image (220).

In other implementations of detecting an object within an image, optical flow is calculated. In general optical flow algorithms recognize motion within images (e.g., objects that have changed positions within images) and construct vectors representing the velocity (e.g., direction/orientation and magnitude) of the motion recognized in the images. Thus, optical flow algorithms determine not only the presence of motion within images, but also the direction and magnitude of motion within images. In addition to a direction and magnitude, an optical flow implementation may report a measure of confidence for each position.

Figure 4:
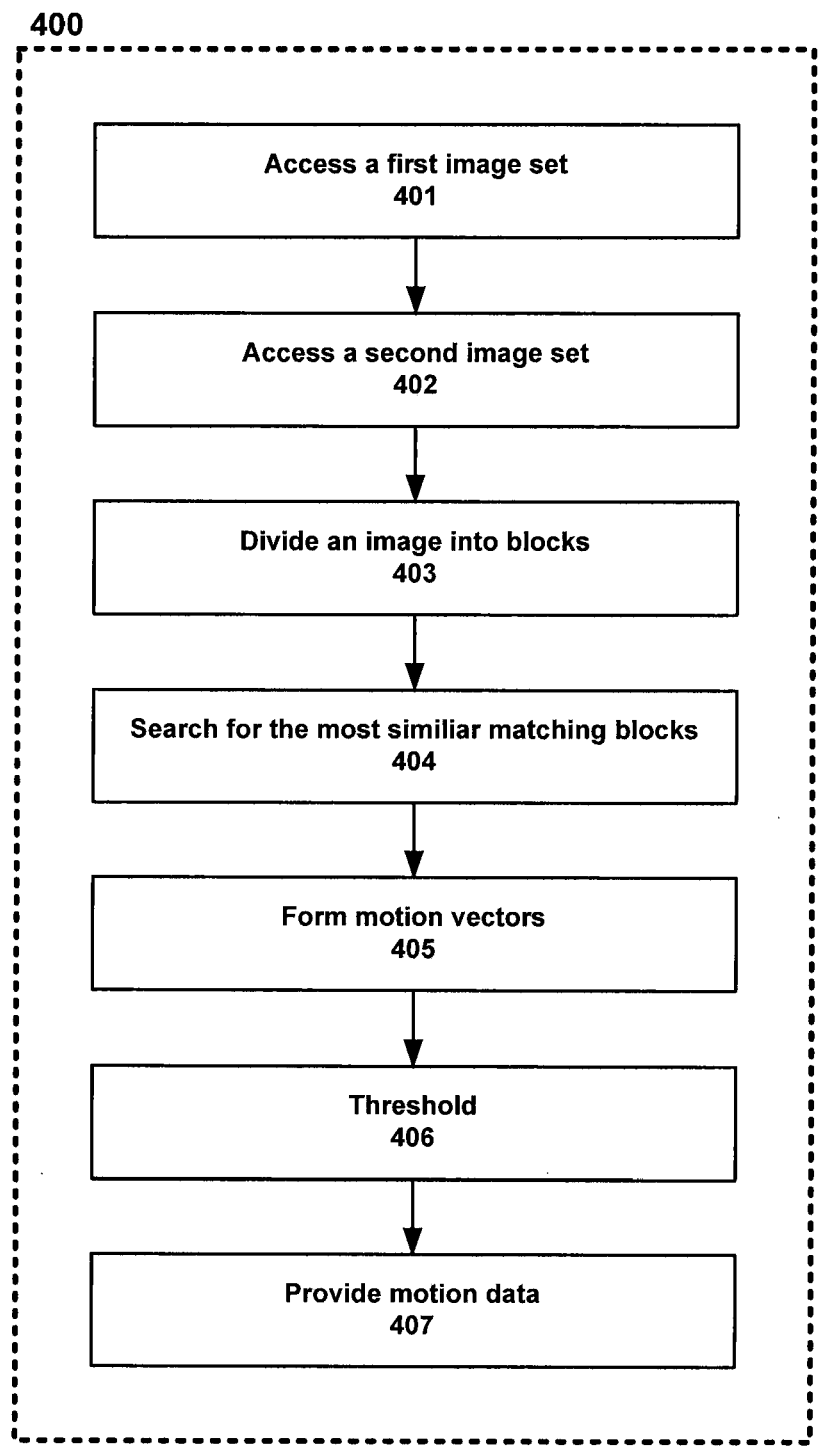

FIG. 4 illustrates another example of a process 400 for detecting an object in an image. The process 400 for detecting an object in an image may be used in detecting an object in the first image (220) in performing process 200.

The process 400 includes accessing a first image set (401) and accessing a second image set (402). Accessing a first image set (401) and accessing a second image set (402) may be performed in a manner similar to accessing a first image set (301) and accessing a second image set (302) described above with respect to FIG. 3. The first image set and second image set may represent consecutive processed camera images or may represent consecutive camera image sets that have not been processed. In some implementations, the images included in the first image set and the second image set may be multi-buffered as described, above with respect to FIG. 3.

In one implementation of an optical flow process, the computing device 140 divides an image into reference blocks (403). For example, the computing device 140 divides an image into blocks of one or more pixels. In some implementations, the computing device 140 divides each of the accessed images into blocks. The reference blocks may be of equal size or may have different sizes. For example, reference blocks may be of different sizes based on the uniqueness of the content included in the reference block.

For each reference block, the computing device 140 identifies a block having similar appearance in the other image, such as, for example, the most similar block (404). The similarity of the block may be calculated as the sum of the pixel value differences for pixels within the block, where a pixel value difference is the difference between the pixel value of a pixel in the reference block to the corresponding pixel in the similar block. The difference may be calculated as the absolute value of the reference pixel value subtracted from the similar pixel value. The most similar block may be selected as the block with the minimum sum of pixel value differences.

In some implementations, the computing device 140 compares a reference block in an image to blocks in another image. The computing device 140 may first compare blocks in the other image that are a position within a predefined distance of the position of the reference block in the image. The computing device 140 may dynamically change the block size if a unique match is not found.

The computing device determines a vector that describes direction and magnitude of motion based on the relative position of each similar block, relative to its corresponding reference block (405). The motion vector may be calculated as the difference in position between the reference block and the most similar matching block, such that the vector indicates the direction and distance that an object within the image moved in the time between acquiring the reference image and acquiring the other image. The computing device may further determine a confidence measure. The confidence measure may be calculated as the sum of the pixel differences, such that the confidence indicates the similarity of the appearance of the image within a block.

Other implementations of optical flow calculation may be used to detect motion of an object within images captured by the camera 110. The image sets may contain multiple channels, as in the case of color images. A pixel value may include the data values of multiple channels. It may be that the difference calculation (e.g., absolute difference) is calculated for each channel, and the result combined. The image sets may contain data from multiple cameras. A pixel value may include data values from multiple cameras. It may be that the difference calculation (e.g., absolute difference) is calculated for each camera's pixel data, and the result combined. The image sets may contain data from multiple camera exposure levels. A pixel value may include data values from multiple exposure levels. It may be that the difference calculation (e.g., absolute difference) is calculated for each exposure level's pixel data, and the result combined. A process of combining a result includes calculating the sum of the various parts. An alternative process of combining a result includes selecting the maximum of the various parts. A further process of combining a result includes selecting the result that is generated from a pre-determined part (e.g., channel, image, or exposure) of the image set.

The computing device 140 may determine the presence of motion based on a threshold (406). For example, a first threshold may be applied on the magnitude of motion, such that a block is classified as motion if the magnitude of the displacement is larger than or equal to the first threshold value. A second threshold may be applied to the similarity of the block match, such that a block is classified as motion if the magnitude of the displacement is larger than or equal to the first threshold value, and the quality of the block match is more similar than the second threshold value.

The computing device 140 provides the classification, direction, and magnitude of motion of pixels as motion data (407). The motion data may include motion of a user and may be used to control an application.

In addition to the processes described above with respect to FIGS. 3 and 4, the computing device 140 may use other techniques to detect an object in the first image (220). For example, the process described with respect to FIG. 5 represents another process the computing device 140 may use to detect an object in the first image (220).

Figure 5:
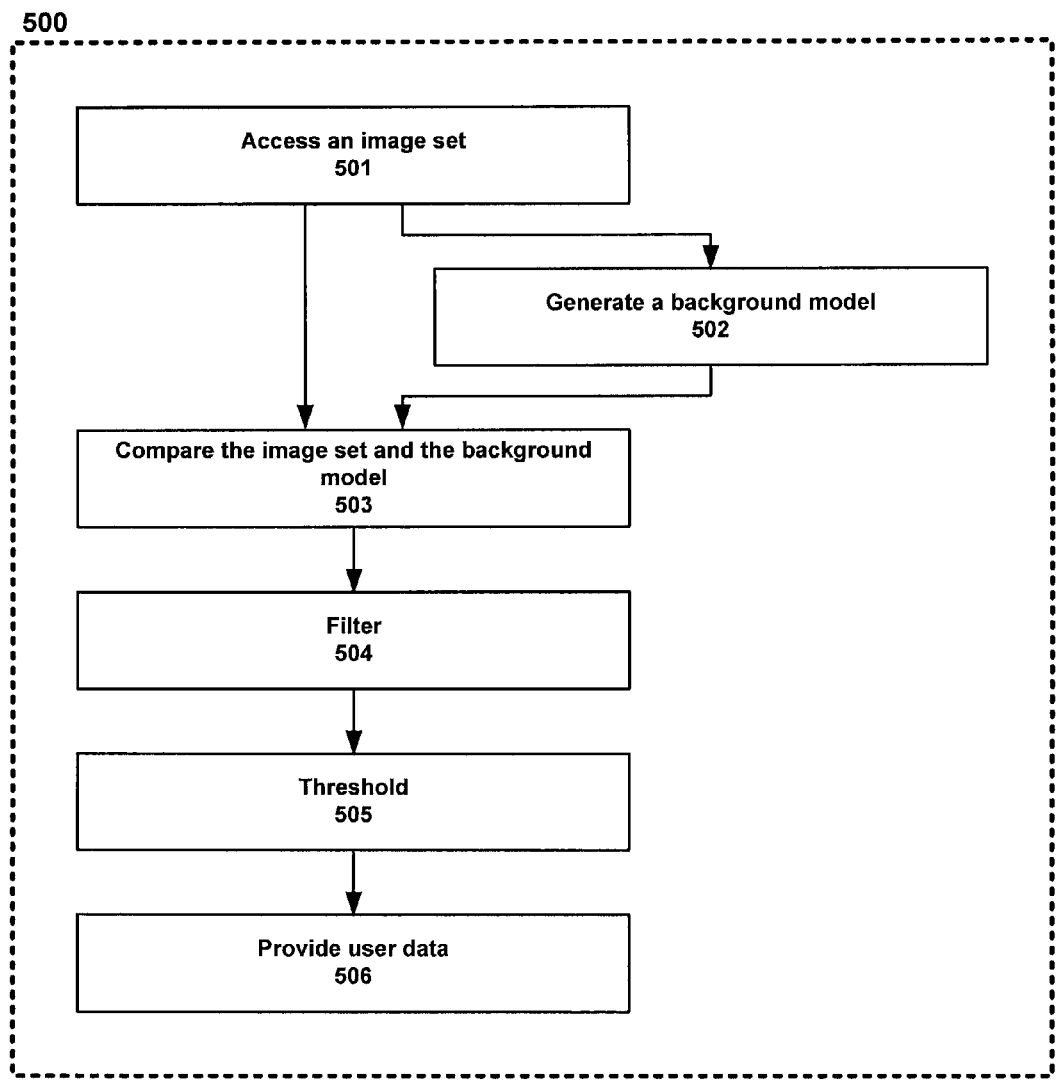

FIG. 5 illustrates another example of a process 560 for detecting an object in an image. The process 500 for detecting an object in an image may be used in detecting an object in the first image (220) in performing process 200. The process 500 uses a model of the background of images captured by the camera 110 to detect an object (e.g., a user) within images captured by the camera 110.

The process 500 includes accessing an image set (501). Accessing an image set (501) may be performed in a manner similar to accessing a first image set (301) and accessing a first image set (401) described above with respect to FIGS. 3 and 4.

The computing device 140 generates a background model (502). In some implementations, the computing device 140 may generate a background model based on images taken by camera 110 during a time at which only stationary or permanent background elements are present within the field of view of the camera 110. In these implementations, the background model may be configured such that an object in an image may be detected based on a comparison between the image and the background model. In some examples, the background model may be static and generated based on images taken prior to images taken for controlling an application based on motion history. In other examples, the background model may be dynamic and generated based on images taken prior to and/or concurrent with images taken for controlling an application based on motion history. For instance, a process for generating a dynamic background model is described below with respect to FIG. 6.

The computing device 140 compares the accessed image set with the background model to identify differences in the images (503). Differences are indicative of object or user presence. The difference operation may calculate the absolute difference in pixel values for each pixel.

In some implementations, the image set may contain multiple channels, as in the case of color images. A pixel value may include the data values of multiple channels. It may be that the difference calculation (e.g., absolute difference) is calculated for each channel, and the result combined. The image sets may contain data from multiple cameras. A pixel value may include data values from multiple cameras. It may be that the difference calculation (e.g., absolute difference) is calculated for each camera's pixel data, and the result combined. The image sets may contain data from multiple camera exposure levels. A pixel value may include data values from multiple exposure levels. It may be that the difference calculation (e.g., absolute difference) is calculated for each exposure level's pixel data, and the result combined.

A process of combining a result includes calculating the sum of the various parts. An alternative process of combining a result includes selecting the maximum of the various parts. A further process of combining a result includes selecting the result that is generated from a predetermined part (e.g., channel, image, or exposure) of the image set.

The computing device 140 may process the difference results using a filtering operation (504). The filtering operation (504) may be performed in a manner similar to the filtering operation (304) described above with respect to FIG. 3.

The computing device 140 processes the filtered difference results using a threshold operation (505). The threshold operation (505) may be performed in a manner similar to the threshold operation (305) described above with respect to FIG. 3.

The computing device 140 provides the classification of pixels obtained in performing the threshold operation as object data (e.g., user data) (506). The object data may be used in controlling an application. For example, in implementations in which the object data represents an object (e.g., a user), a representation of the object (e.g., the user) may be displayed on the display device 120 as part of the application.

Figure 6:
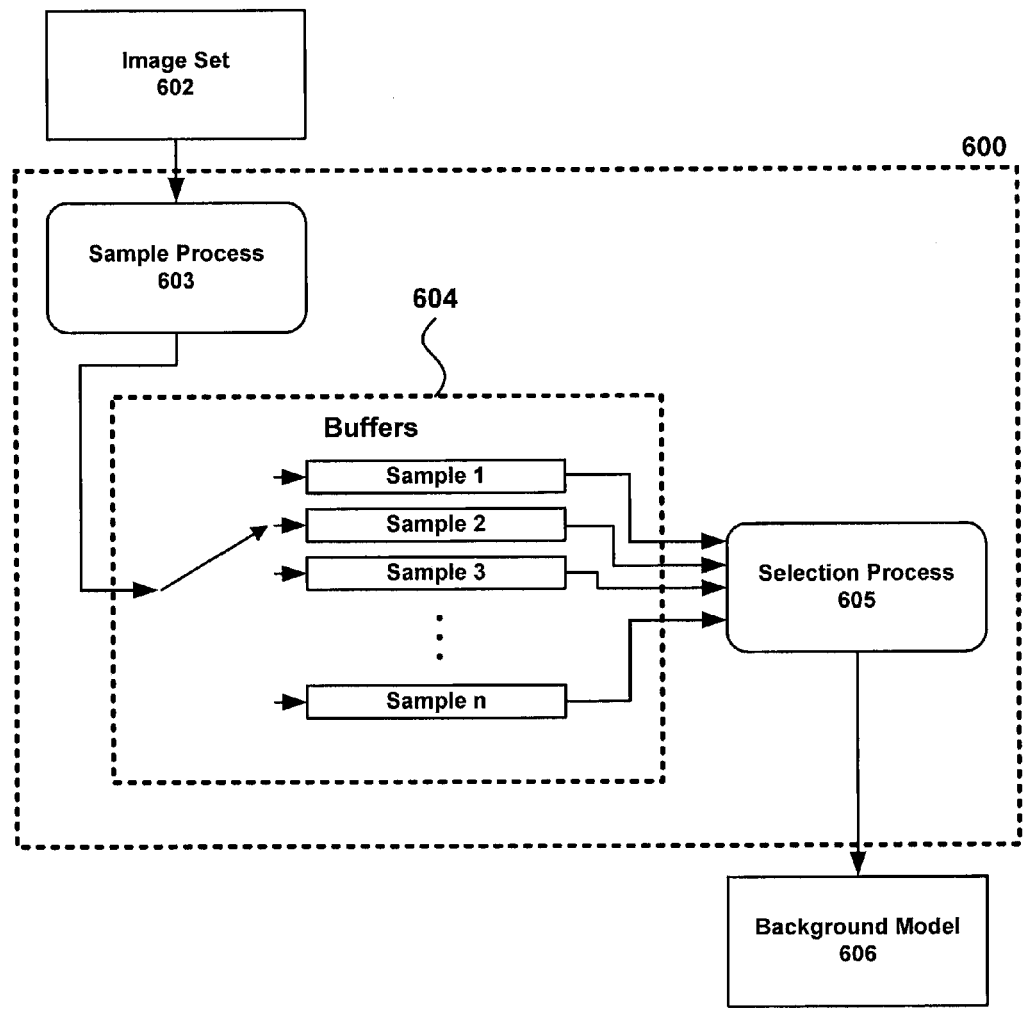
FIG. 6 is a flow chart illustrating an example of a process for generating a dynamic background model.

FIG. 6 illustrates an example of a process 600 for generating a dynamic background model. The process 600 for generating a dynamic background model may be used in generating a background model (502) in performing process 500. The background model produced by process 600 may be dynamic, such that it is automatically updated to changes in the scene.

The computing device 140 accesses an image set (602). The accessed image set may be the image set accessed in step 501 described above with respect to FIG. 5.

The computing device 140 samples the accessed image set using a sampling process (603). A sample may include the user in addition to the background. In some implementations, a single pixel value is sampled for each pixel of the images contained within the accessed image set. In other implementations, a range of values is sampled for each pixel of the images contained within the accessed image set. The range of values may represent the range of values observed for that pixel over a short period of time.

By including the effects of this range in the background model, signal noise can be modeled. Contributing multiple frames of data to the sample allows this range to be observed, but also increases the portion of the background that may be occluded by the user, if the user is in motion while frames are being sampled. The optimal number of frames to use is dependent on the expected motion of the user. Although an optimal number of frames may be used, a number of frames different than the optimal number of frames may be used depending on the specific configuration. For instance, a number of frames less than the optimal number of frames may be, used to decrease processing power associated with detecting a user. In one implementation, ten frames are sampled because ten frames is sufficient to observe the majority of the range without allowing motion of the user to occlude an undue portion of the background.

An image set may contain multiple channels, as in the case of color images. A sampled pixel value may include the data values of multiple channels. An image set may contain data from multiple cameras. A sampled pixel value may include data values from multiple cameras. An image set may contain data from multiple camera exposure levels. A pixel value may include data values from multiple exposure levels.

The computing device 140 adds samples obtained from the sampling process (603) to a buffer 604 having storage locations to store multiple (e.g., n) samples, where the oldest sample in the history is replaced when a new sample is added. The history, therefore, contains n sampled values for each pixel. A sample value may include multiple data values representing multiple color channels of the image or data from multiple cameras. A sample value may further include a representation of a range, if the sampling process (603) produces a range. The span of time, d, represented in the buffer is dependent on the rate that new samples are acquired and added to the history, r, are expressed by Equation (1):

$$d = \frac{n}{r} \quad (1)$$

In this implementation of a dynamic background model, the computing device 140 performs a selection process (605) to select, for each pixel, a value determined to be representative of the background at the location represented by the pixel. One process of selecting a value representative of the background is to select the median value of the it samples of each pixel. For any pixel, a number of the it sampled values in the buffer may represent the user. Duration d may be selected so that it is unlikely that the user will occlude any one pixel of the background for an accumulated duration of d/2 or longer within any time-span of d. Therefore, for any pixel, the majority of the sampled values will be representative of the background, and, therefore, the median of the sampled values will be a value, representative of the background.

The multiple samples in the buffer 604 may be initialized to a first set of generated samples. Alternatively, the multiple samples in the buffer 604 may be initialized to predefined data. The predefined data may represent samples acquired at a time when the scene is known to be absent of a user.

The computing device 140 provides the dynamically generated background model (606). For example, the dynamically generated background model may be used in process 500 to detect an object within an image set.

In addition to the processes described above with respect to FIGS. 3 to 6, the computing device 140 also may use other techniques to detect an object in the first image (220). For example, the process described with respect to FIG. 7 represents another process the computing device 140 may use to detect an object in the first image (220).

Figure 7:
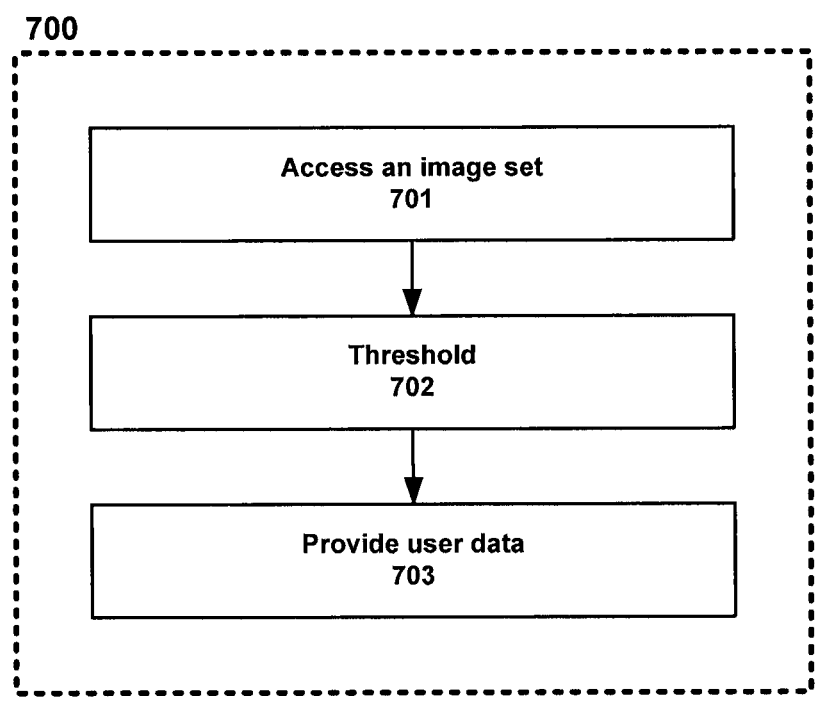
FIG. 7 is a flowchart illustrating an example of a process for detecting an object in an image.

FIG. 7 illustrates another example of a process 700 for detecting an object in an image. The process 700 for detecting an object in an image may be used in detecting an object in the first image (220) in performing process 200.

The computing device 140 accesses an image set (701). Accessing an image set (701) may be performed in a manner similar to accessing an image set (501) described above with respect to FIG. 5.

The computing device 140 processes images included in the accessed image set using a threshold operation (702). For example, the threshold operation may compare each pixel of the images to a threshold value. If a pixel has a value larger than or equal to the threshold value, that pixel is classified as having motion, otherwise that pixel is classified as having no motion.

The computing device 140 produces object data (e.g., user data) based on the threshold operation (703). The computing device provides the classification of pixels as object data.

In some implementations, the computing device 140 may provide camera control data to the camera 110 to control parameters with which the camera captures images. The computing device 140 may control parameters of the camera 110 to improve the ability to detect an object or a user in images captured by the camera. For example, camera control data affects camera parameters including exposure time, gain, and iris. In some implementations, the computing device 140 calculates the average pixel value within a camera image set, or a part thereof. If the average pixel intensity is lower than a threshold, the computing device 140 generates camera control data that causes the camera to increase its sensitivity (e.g., image brightness). If the average pixel intensity is lighter than a threshold, the computing device 140 generates camera control data that causes the camera to decrease its sensitivity (e.g., image brightness).

It may be that the camera is adjusted in fine steps that result in a change of sensitivity (e.g., image brightness) that is sufficiently small as not to disrupt the proper operation of detecting objects within a set of images. In implementations utilizing process 300 to detect an object within an image, the step size, should be fine enough so that the effective change in brightness is less than the threshold value of the threshold process (305). Similarly in implementations utilizing other processes (e.g., processes 400, 500, or 700) to detect an object within an image, the step size may be fine enough so that the effective change in brightness is less than the threshold value of the threshold process (e.g., the threshold value used in references 406, 505, or 702). In an alternative implementation, a camera's parameters including exposure time, gain, and iris may be determined by an auto-exposure process built into the camera 110. In this case, the camera control data may be generated by the camera 110.

Camera control data may be used in a process of detecting an object within an image. For example, in implementations utilizing process 300, the threshold value of the threshold process (305) may be temporarily increased, such that the threshold value is larger than the difference in pixel value caused by camera control data. Similarly, in implementations utilizing other processes (e.g., processes 400, 500, or 700), the threshold value of the threshold process (e.g., the threshold value used in references 406, 505, or 702) may be temporarily increased, such that the threshold value is larger than the difference in pixel value caused by camera control data.

The signal-to-noise ratio of the camera image set may be affected by the gain level. In implementations utilizing process 300, the threshold value of the threshold process (305) may be automatically adjusted, such that the threshold value is larger than the noise level expected at the camera's gain level. Similarly, in implementations utilizing other processes (e.g., processes 400, 500, or 700), the threshold value of the threshold process (e.g., the threshold value used in references 406, 505, or 702) may be automatically adjusted, such that the threshold value is larger than the noise level expected at the camera's gain level.

Camera control data also may be used to detect ambient light level. In some implementations, the computing device 140 or the camera 110 compares a camera exposure time (e.g., indicated by the camera control data) to a threshold time, and compares a camera gain level (e.g., indicated by the camera control data) to a threshold gain level. If the exposure time is shorter than the threshold time, or a gain lower than the threshold gain level, daylight processing mode may be triggered. If the camera control data indicates that the camera is using an exposure time longer than a threshold time, or a gain higher than a threshold level, use of a nighttime processing mode may be triggered. The camera control data may further include illuminator 130 control data that controls operation of the illuminator 130.

In scenes lit by sunlight, the contrast may be very high. Under these conditions, some video cameras may not detect sufficient contrast in shadow regions to detect an object (e.g., a user) in an image. In some implementations, the camera 110 may include a high dynamic range camera. A high dynamic range camera has a high dynamic range, and therefore may provide the necessary contrast to detect objects in images simultaneously in both shadow and sunlit regions. High dynamic range cameras may have higher cost than other cameras, and may have insufficient dynamic range for bright sunlight operation. The camera 110 may use other techniques to extend the dynamic range of any type of camera.

In some implementations, to extend the dynamic range of a camera, a camera may be controlled to alternate between two or more exposure times in rapid succession. In these implementations, a first camera image is captured at a first exposure duration, and a second camera image is captured at a second exposure duration. The first exposure duration is short, so that sunlit parts of the scene appear in high contrast in the first camera image. Shadow parts of the scene may appear very dark in the first camera image. The second exposure duration is longer than the first, so that shadow parts of the scene appear in high contrast in the second camera image. Sunlit parts of the scene may appear as pure white in the second camera image. In these implementations, a camera image set and a processed camera image set include a first camera image captured at a first exposure duration, and a second camera image captured at a second exposure duration. The process of detecting an object within an image (220) may utilize both the first image and the second image of the image set. Other processes, such as an application control process and a keying process, may use only the first image.

In other implementations, to extend the dynamic range of a camera, the camera 110 may include two or more cameras. In these implementations, a first camera image is captured by a first camera, and a second camera image is captured by a second camera. The first camera uses a short exposure duration, or other means such as a lens filter, so that sunlit parts of the scene appear in high contrast in the first camera image. Shadow parts of the scene may appear very dark in the first camera image. The second camera uses an exposure duration that is longer than the first, or other means such as a higher gain level, so that shadow parts of the scene appear in high contrast in the second camera image. Sunlit parts of the scene may appear as pure white in the second camera image. In these implementations, a camera image set and a processed camera image set may include a first camera image captured by a first camera, and a second camera image captured by a second camera. The process of detecting an object within an image (220) may utilize both the first image and the second image of the image set. Other processes, such as an application control process and a keying process, may use only the first image.

In further implementations, to extend the dynamic range of a camera, the camera 110 may include a camera capable of applying unique gain levels to sets of sensor elements. This may include many color cameras, where a unique gain level may be applied to a red set, green set, and blue set of sensor elements. The gain level of a first set of sensor elements may be set to a low level, and the camera's exposure may be set such that sunlit parts of the scene appear in high contrast in that set's data. In a color camera, for example, the first set may be the set of blue sensor elements, since the blue elements may be less sensitive than other elements. The gain level of a second set of sensor elements is set to a higher level, so that shadow parts of the scene appear in high contrast in the second camera image. In a color camera, for example, the second set may be the set of green sensor elements, since the green elements may be very sensitive. The gain) level of additional sets of sensor elements may be set to obtain intermediate sensitivity. In a color camera, a color lens filter may be installed, where the lens filter suppresses (but does not completely block) green light, thereby further extending the difference in sensitivity between the first and second sets of sensor elements. In these implementations, a camera image set and a processed camera image set may include multiple channels of data. The process of detecting an object within an image (220) may utilize the multiple channels of the image data. In these implementations, the image's appearance may appear tinted. A second camera may be used to acquire another image that is a visually pleasing image. Other processes, such as an application control process and a keying process, may use the visually pleasing image.

In dimly lit scenes, such as those encountered indoors or during nighttime operation, the brightness may be very low. Under these conditions, an illuminator 130 may be utilized. An illuminator 130 may provide visible light, so that the images captured by the camera 110 are visually pleasing and may be displayed to the user. Alternatively, an illuminator 130 may provide infrared light that the camera can detect. The wavelength of infrared light may be 850 nm, since many cameras are capable of sensing this wavelength and users cannot. In implementations utilizing infrared illumination, grayscale cameras may be used. A second camera may be used to acquire a second image, such as a color camera, and other processes, such as an application control process and a keying process, may use the second image.

In some implementations, an illuminator 130 may be synchronized with a camera 110, so that the illuminator 130 is flashed during alternating frames. A camera 110 captures a first image that is illuminated by the illuminator 130, and a second image that is not illuminated by the illuminator 130. A capture process may subtract the pixel values of the second image from the corresponding pixel values of the first image. The resulting image may be included in a processed camera image set. This process isolates parts of the image that are illuminated by the illuminator 130, while effectively removing parts of the image illuminated by ambient light.

The illuminator 130 may be positioned near the display device 120. The intensity of emitted light decreases as the distance from an illuminator 130 from the object being imaged is increased. In some implementations, the amount of emitted light cast upon people or objects in the background is significantly less than the amount of emitted light cast upon a user. In these implementations, for example, the process 700 for detecting an object (e.g., a user) in an image, as shown in FIG. 7, may sufficiently detect the user. The threshold value used in the threshold process (702) may be set to a value that is greater than the expected pixel value of background people and objects. Because the illuminator 130 illuminates the user greater than the people or objects in the background, the threshold may be set, such that any pixels greater than the threshold are assumed to be the user as a result of the greater illumination.

The illuminator 130 may be positioned above, so that the emitted light illuminates the user, without illuminating people or objects in the background. In this implementation, for example, the process 700 for detecting an object (e.g., a user) in an image, as shown in FIG. 7, may sufficiently detect the user. The threshold value used in the threshold process (702) may be set to a value that is greater than the expected pixel value of un-illuminated background people and objects.

Referring again to FIG. 2, the computing device 140 generates an object data map based on detecting the object in the first image (230). For example, the computing device 140 may divide the image into multiple portions (e.g., pixels) and, for each portion in the image, provide an indication as to whether the object (e.g., the user) was detected in that portion of the image. In this example, the object data map may include information associated with each pixel included in the image. For instance, the object data map may include information indicating whether the object (e.g., the user) was detected at each pixel in the image. The computing device 140 may generate the object data map based on the motion data and/or the object data (e.g., user data) provided by processes 300, 400, 500, and/or 700 described above with respect to FIGS. 3 to 5 and 7.

The computing device 140 generates a motion history indicating the time since the object was detected at each portion of the image included in the object data map (240). For example, the computing device 140 may analyze the multiple portions included in the object data map and, for each portion in the object data map, update an indication of the time since the object (e.g., the user) was detected in that portion of the image. In this example, the computing device 140 may update the information included in the motion history based on whether the object was detected in a corresponding portion of the object data map. For instance, the motion history may be updated to indicate that the object was detected in the most recent detection process for all of the portions in the object data map at which the object was detected. For all of the portions in the object data map at which the object was not detected, the computing device may increase or maintain an amount of time since the object has been detected at the corresponding portion.

In some implementations, the time since the object has been detected may have a maximum value such that any time over the maximum value may not result in an update of the motion history for that portion. The motion history may include information associated with each pixel included in the image. For instance, the motion history may include information indicating the time since the object (e.g., the user) has been detected at each pixel in the image. The motion history may be maintained as a pixel map including an indication of time since the object (e.g., the user) was detected at each pixel included in the object data map. The indication of time since the object (e.g., the user) was detected may include a frame count since the object was last detected, a time value indicating a time that the user was last detected, or a time value indicating a time since the user was last detected.

Figure 8:
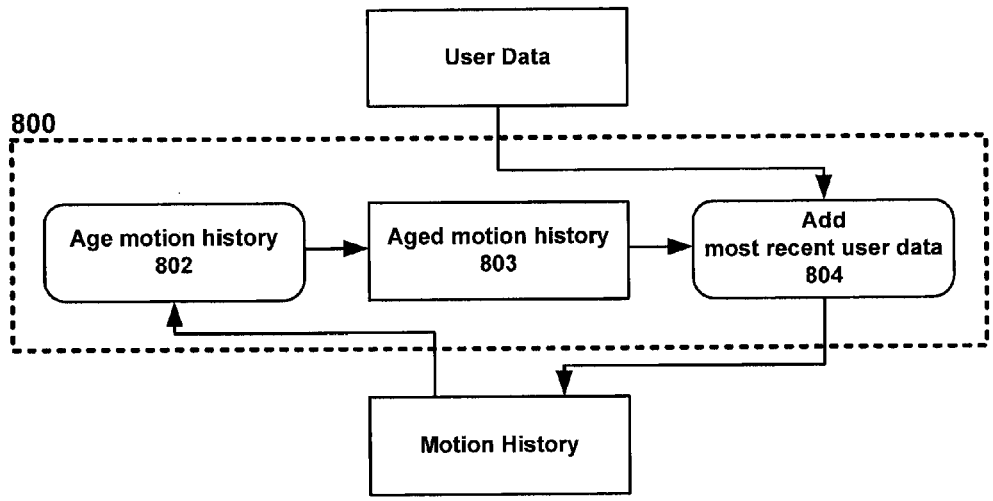
FIGS. 8 to 11 are flowcharts illustrating examples of processes for generating a motion history.

FIG. 8 illustrates an example of a process 800 for generating a motion history. The process 800 for generating a motion history may be used in generating a motion history (240) in performing process 200. In some implementations, the generated motion history includes, for each pixel, a representation of the number of frames since the object (e.g., the user) was detected in that position.

The computing device 140 ages a previously calculated motion history (802) to produce an aged motion history (803). For example, the computing device 140 increments a frame count associated with each pixel included in the previously calculated motion history to produce the aged motion history where each pixel's frame count indicates that the last time that position was occupied by an object or user is one frame further in the past.

The computing device 140 adds data included in the object data map (e.g., the user data) to the aged motion history (804). For example, for pixels of the object data map (e.g., the user data) that have been classified as pair of an object (e.g., a user), the corresponding pixel in the motion history is set to have a frame count that indicates that the pixel is currently occupied by an object (e.g., a user). In this example, the computing device 140 may set pixels determined to be currently occupied by the object (e.g., the user) to a value of zero and maintain the aged frame count for pixels determined to be unoccupied by the object (e.g., the user). The result is generated as the current motion history, overwriting the previously calculated motion history.

Figure 9:
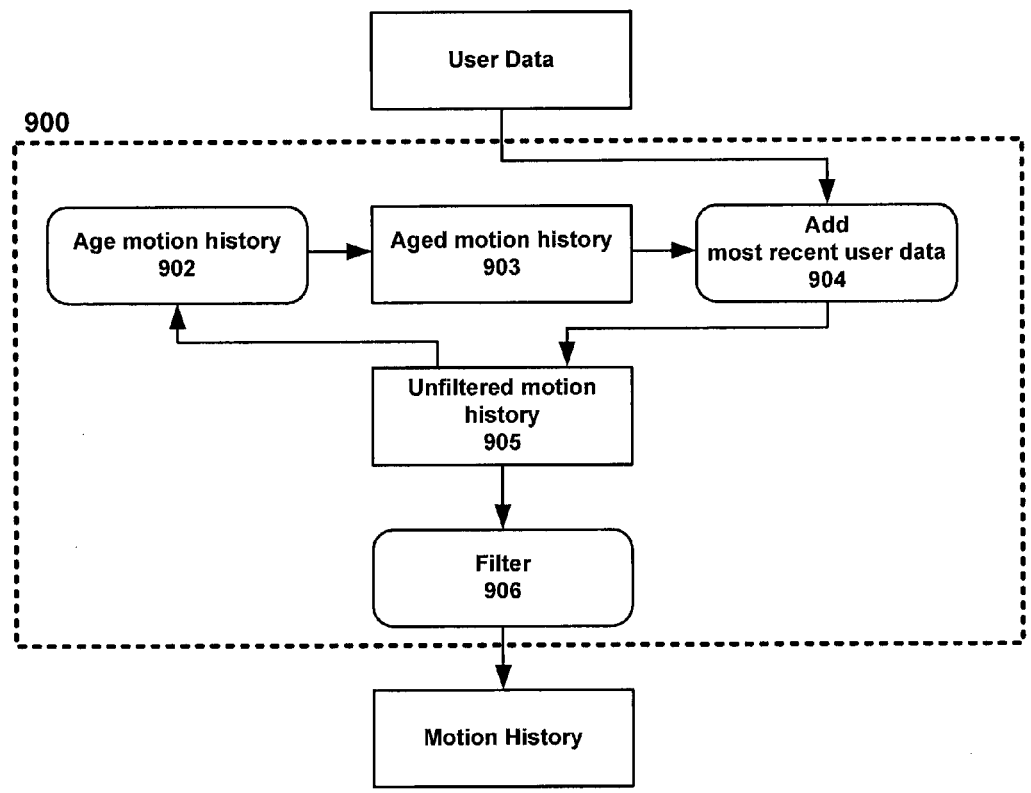

FIG. 9 illustrates an example of a process 960 for generating a motion history. The process 900 for generating a motion history may be used in generating a motion history (240) in performing process 200. In some implementations, the generated motion history includes, for each pixel, a representation of the number of frames since the object (e.g., the user) was detected in that position.

The computing device 140 accesses a previously calculated intermediate motion history (905) and ages the previously calculated intermediate motion history (902) to produce an aged motion history (903). For example, the computing device 140 increments a frame count associated with each pixel included in the previously calculated intermediate motion history to produce the aged motion history where each pixel's frame count indicates that the last time that position was occupied by an object or user is one frame further in the past.

The computing device 140 adds data included in the object data map (e.g., the user data) to the aged motion history (904). For example, for pixels of the object data map (e.g., the user data) that have been classified as part of an object (e.g., a user), the corresponding pixel in the motion history is set to have a frame count that indicates that the pixel is currently occupied by an object (e.g., a user). In this example, the computing device 140 may set pixels determined to be currently occupied by the object (e.g., the user) to a value of zero and maintain the aged frame count for pixels determined to be unoccupied by the object (e.g., the user). The result is generated as a current intermediate motion history, overwriting the previously calculated intermediate motion history.

The computing device 140 filters the current intermediate motion history to produce a motion history (906). The filter process (906) may include an averaging kernel. In this example, for each pixel, the sum is calculated for all the pixels within a neighborhood centered on that pixel. An averaging kernel is commonly used for blurring an image. In this example, the overall shape may be smoother, the edges may appear softer, and the steps may be less visible.

Figure 10:
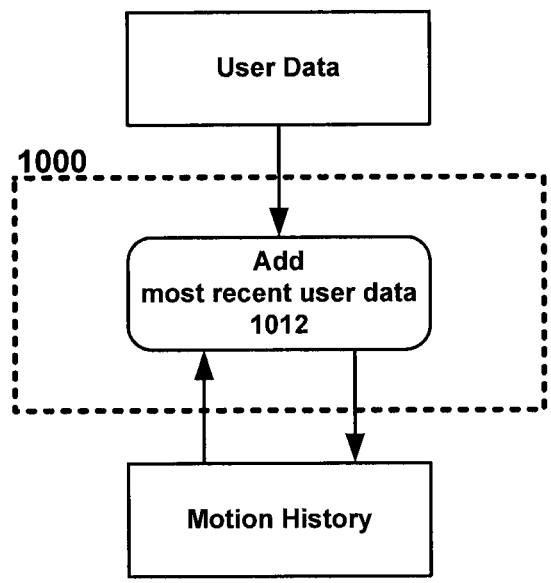

FIG. 10 illustrates an example of a process 1000 for generating a motion history. The process 1000 for generating a motion history may be used in generating a motion, history (240) in performing process 200. In some implementations, the generated motion history includes, for each pixel, a representation of a time that the user was detected in that position.

The computing device 140 adds data included in the object data map (e.g., the user data) to a previous motion history (1012). For example, for pixels of the object data map (e.g., the user data) that have been classified as part of an object (e.g., a user), the corresponding pixel in the motion history is set to have a representation of the current time. The time data, for the pixels of the previous motion history that correspond to pixels in object data map (e.g., the user data) that have not been classified as part of the object (e.g., the user), is maintained to reflect the last time the object (e.g., the user) was detected at that position. The result is generated as the current motion history.

Figure 11:
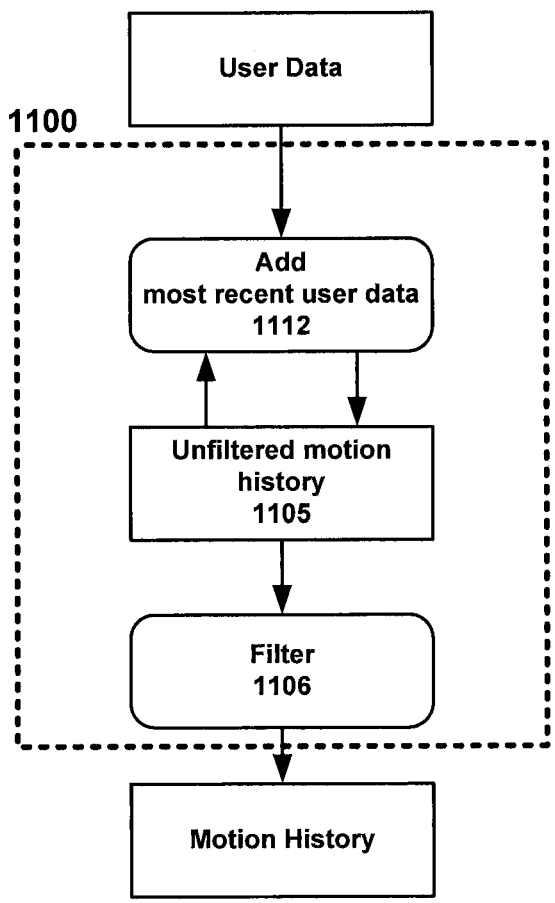

FIG. 11 illustrates an example of a process 1100 for generating a motion history. The process 1100 for generating a motion history may be used in generating a motion history (240) in performing process 200. In some implementations, the generated motion history includes, for each pixel, a representation of a time that the user was detected in that position.

The computing device 140 accesses a previously calculated intermediate motion history (1105) and adds data included in the object data map (e.g., the user data) to the previously calculated intermediate motion history (1112). For example, for pixels of the object data map (e.g., the user data) that have been classified as part of an object (e.g., a user), the corresponding pixel in the previously calculated intermediate motion history is set to have a representation of the current time. The time data, for the pixels of the previously calculated intermediate motion history that correspond to pixels in object data map (e.g., the user data) that have not been classified as part of the object (e.g., the user), is maintained to reflect the last time the object (e.g., the user) was detected at that position. The result is generated as the current intermediate motion history.

The computing device 140 filters the current intermediate motion history to produce a motion history (1106). The filter process (1106) may include an averaging kernel. In this example, for each pixel, the sum is calculated for all the pixels within a neighborhood centered on that pixel. An averaging kernel is commonly used for blurring an image. In this example, the overall shape may be smoother, the edges may appear softer, and the steps may be less visible.

Referring again to FIG. 2, the computing device 140 controls an application based on the motion history (250). For example, the computing device 140 may control an application to render a representation of an object (e.g., a user) in a display image associated with the application. In this example, the representation of the object may be a representation of a user interacting with the application. The user may be physically interacting based on display images rendered, by the application, on the display device 120.

In some implementations, rendering a representation of the object (e.g., the user) may include rendering a processed or unprocessed camera image as the representation of the object (e.g., the user) in a display image of the application. Rendering a representation of the object (e.g., the user) also may include rendering a keyed image as the representation of the object (e.g., the user) in a display image of the application. Rendering a representation of the object (e.g., the user) further may include rendering an effect image as the representation of the object (e.g., the user) in a display image of the application.

The representation of the object (e.g., the user) may be based on the motion history such that the representation includes characteristics corresponding to past motion of the object (e.g., the user). For example, in implementations in which the object is a user, the representation of the user in the display image may include a trailing effect for movements of the user. In this example, when a user moves (e.g., an arm or a leg), the representation of the user may include a trailing effect showing the movement of the user (e.g., the movement of the user's arm or leg). For instance, the representation of the user may include a display of the current position of the user with a full level of opaqueness and a display of past positions of the user with a decreasing level of opaqueness such that the movements of the user are displayed with a trailing effect that gradually fades over time. The representation may be an actual image of the user or may be based on an animated image that corresponds to the user (e.g., a character in a game application corresponding to the user playing the game). The trailing effect may be a visually pleasing display of the representation of the user.

In other implementations, a particle system may display a representation of the user having characteristics of past motion of the user. In these implementations, the motion history associated with the user may be input to the particle system and the particle system may render a display based on the motion history. For example, in a fluid simulation application, the fluid simulation application may display a representation of the user as water ripples. In this example, the water ripples corresponding to the user's more recent movements may be greater than the water ripples corresponding to the user's past movements.

In some implementations, the computing device 140 may provide the motion history information to an application as alpha values in an alpha channel. The information in the alpha channel may be directly used by the application to render a display image including a representation of the user based on the motion history of the user.

In some implementations, controlling an application based on the motion history may include determining a user input command based on the motion history. For example, the computing device 140 may determine that the user touches a virtual object in a display image of the application based on the motion history. In this example, the computing device 140 may determine that a user has touched a virtual ball, a virtual character, or an input control based on the motion history. For instance, if the user's tracked motion captured by the motion history intersects the virtual object rendered by the applications the computing device 140 may determine that the virtual object has been touched.

In some examples, the sensitivity may be controlled to make it more difficult or less difficult to touch a virtual object. For instance, the computing device 140, may determine that a user has touched an object only if the current position of the user intersects the virtual object. In another example, the computing device 140 may determine that a user has touched an object if the motion history indicates that the position of the user intersects or has intersected the virtual object within a particular number of frames or within a particular time period.

FIGS. 12 to 22 illustrate examples of manipulating virtual objects in an application. The manipulation of virtual objects in an application may be examples of controlling an application based on motion history (250) described with respect to FIG. 2.

Figure 12:
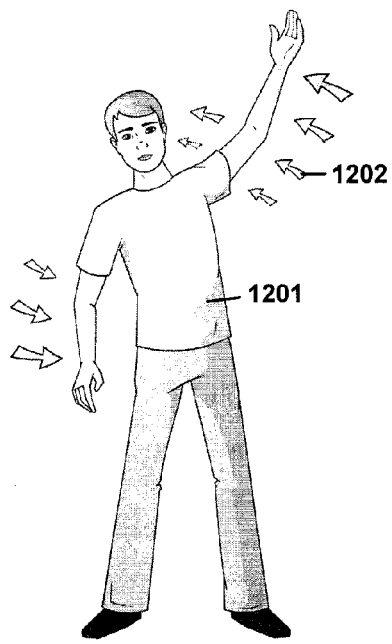
FIGS. 12 to 22 illustrate examples of manipulating virtual objects in an application.

For example, FIG. 12 illustrates an example of a user 1201. Arrows 1202 indicate the direction in which the user 1201 is moving his arms and upper body. The camera 110 may capture images of the user 1201 moving in this manner and the computing device may generate a motion history based on the captured images.

Figure 13:
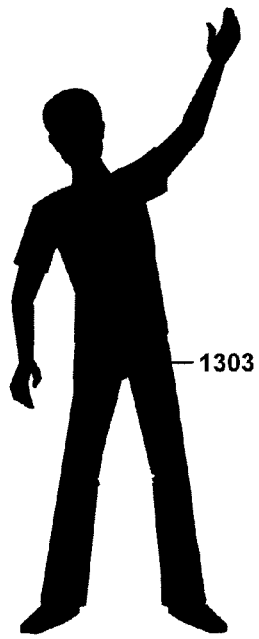

FIG. 13 illustrates a representation on an object data map corresponding to the example of the user 1201 moving. For instance, the black portion 1303 represents the position in an image at which the user has been most recently detected. The object data map may include a data value for each pixel in the image such that the pixels representing the black portion 1303 have a data value of, for example, one and the pixels representing the white portion have a data value of, for example, zero.

Figure 14:
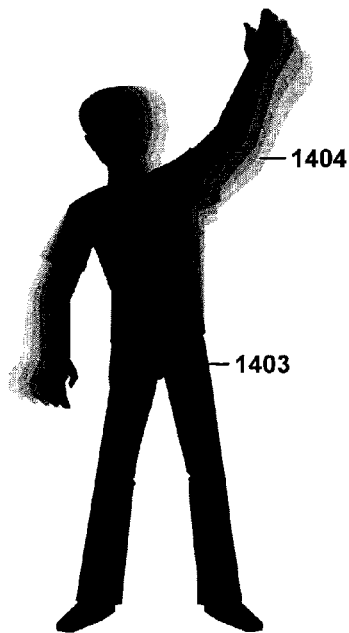

FIG. 14 illustrates a visualization of an example of a motion history. The black portion 1403 corresponds to the black portion 1303 described with respect to FIG. 13. The black portion 1403 represents the position in an image at which the user has been most recently detected. The gray parts 1404 of FIG. 14 represent portions where the user was detected in previous object data maps (e.g., user data) (not shown), where the darker gray is more recent and the lighter gray is older. In some implementations, the motion history includes a value (e.g., a frame count or a time) for each pixel in an image indicating a time since an object (e.g., a user) has been detected at that pixel. In these implementations, the value corresponds to a particular grayscale color ranging from white or none (e.g., for pixels at which the object has never been detected or has not been detected for greater than a threshold number of frames or amount of time) to black (e.g., for pixels at which the object has been most recently detected). Further, in these implementations, rendering a representation of the object based on the motion history may include rendering a display image of the user by rendering the corresponding grayscale color for each pixel included in the motion history.

In some implementations, each value in the motion history may correspond to a different level of transparency (rather than a grayscale color) such that color images may be used in displaying a representation of an object based on motion history. For example, for pixels at which the object has been most recently detected, the corresponding pixel is displayed in the display image of the application as fully opaque. For pixels at which the object has never been detected or has not been detected for greater than a threshold number of frames or amount of time, the corresponding pixel is displayed in the display image of the application as fully transparent.

Figure 15:
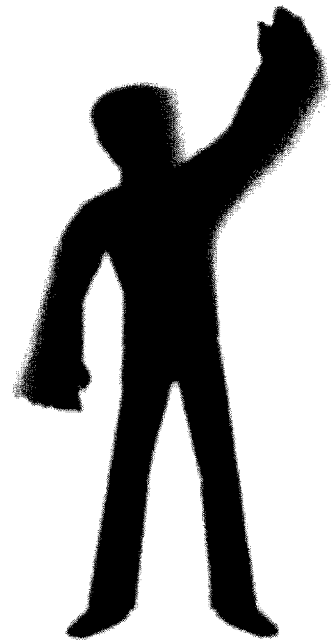

FIG. 15 illustrates a visualization of an example of a filtered motion history. For example, the data displayed in FIG. 14 may be filtered (e.g., by using techniques similar to those discussed above with respect to references 906 or 1106) to produce the visualization shown in FIG. 15. As shown in FIG. 15 as compared to FIG. 14, the overall shape is smoother, the edges appear softer, and the steps are less visible.

Figure 16:
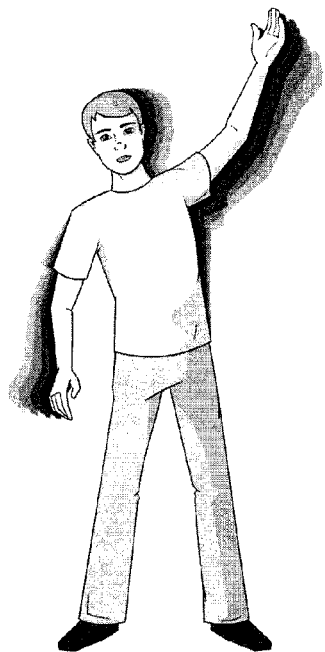

FIG. 16 illustrates an example of a representation of a user displayed in a display image of an application based on motion history. As shown in FIG. 16, past motion of the user is illustrated as varying levels of grayscale colors or varying levels of opacity such that past motion of the user appears as a trail effect.

Figure 17:
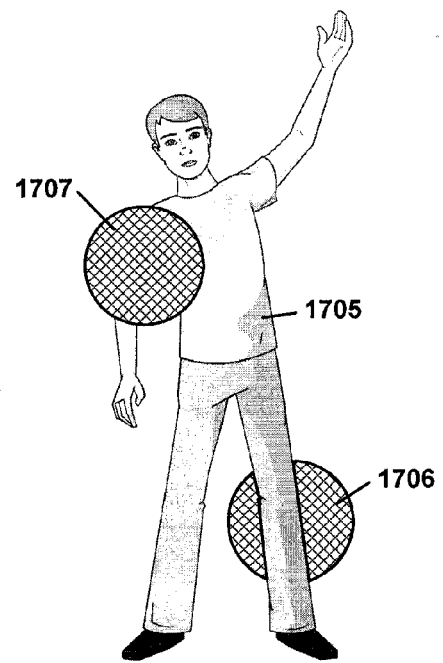

FIG. 17 illustrates an example a display image resulting from controlling the application based on motion history. In this example, the representation of the user is a keyed image 1705 that is combined with application images 1706 and 1707 (e.g., virtual object images). In this example, a keyed image 1705 is rendered above an application image 1706, and the application image 1706 is visible in parts of the keyed image 1705 that are transparent as determined in the alpha channel, while opaque parts of the keyed image 1705 occlude the application image 1706. Additionally, an application image 1707 may be rendered above the keyed image 1705, such that the application image 1707 may occlude, the keyed image 1705.

Figure 18:
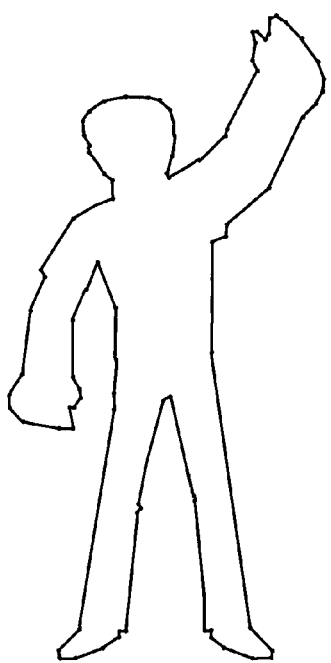

FIG. 18 illustrates an example an image processed using an outlining process that may be used in controlling an application based on motion history. The outline process may generate outline data that represents the contour of the motion history. For example the motion history may be generated as a bitmap—a multi-dimensional array of data containing an element for every pixel. The outline data may include a set of coordinates surrounding the pixels of the motion history having motion more recent that a predefined threshold. The outline data may contain fewer data elements than a bitmap representation, which is advantageous for some applications and may improve computational efficiency.

In some implementations, the outline process further includes a process to reduce the number of data points in the outline data. A process to reduce the number of data points includes removing points that fall within a relatively straight line. In another example of outline processing, a process may remove the contours of isolated objects whose size is small. Exemplary outline data is shown in FIG. 18, which depicts a contour corresponding to the motion history illustrated in FIG. 15. As shown, the thickness of the user's arm includes a contour corresponding to all motion of the user included in the motion history and occurring less a threshold from the current time. The reduced data points are illustrated as dots along the contour. The data obtained from outline processing may be used in controlling an application. For instance, the computing device 140 may determine whether a user has touched a virtual object by comparing the outline of the user with the position of the virtual to determine whether the two intersect. The outline data also may be provided to a particle simulation application that is controlled based on the outline data (e.g., so that particles may be emitted from points on the contour, or may be repelled by the points on the contour).

Figure 19:
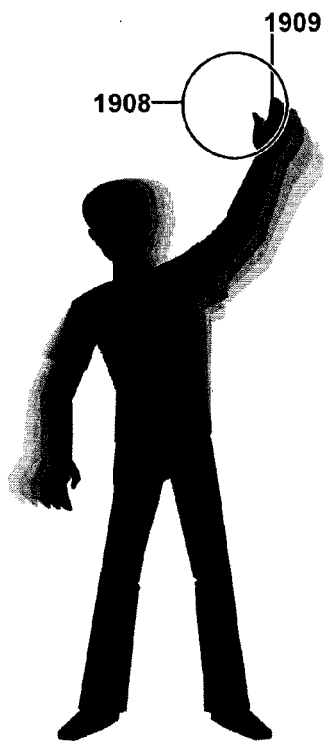

FIG. 19 illustrates an example of a user interacting with a virtual object included in a display image of an application. In some implementations, the user may interact by moving in a way that causes the user's representation in the display image to "touch" a virtual object in the display image. Determining that the user touches a virtual object may include identifying any part of the user as being coincident to the virtual object. A region 1908, representing the virtual object, may be identified by the application. The region 1908 may represent the virtual object's boundary shape, or the region may be larger than the virtual object in order to make it easier for the user to touch the virtual object. The motion history may be compared to the region 1908 and a part 1909 of the motion history may be classified as part of a user with a frame count (or time) more recent than a predetermined threshold. The likelihood of multiple events (e.g., transitions from not touched to touched state) for a single user action is reduced as the frame count (or time) is increased. For this reason, it may be advantageous to use the motion history, instead of the object data map (e.g., current user data), although the object data map may be used.

In other implementations, the alpha channel of a keyed image or outline data may be used in place of the motion history, as they provide a representation of the motion history. In some examples, the region 1908 may be stationary (e.g., a "button") or moving according to the application (e.g., a "ball"). An event (e.g., a transition from the untouched to the touched state) may trigger an action in the application. An action may include activation, selection, or movement of an object in the display image.

Figure 20:
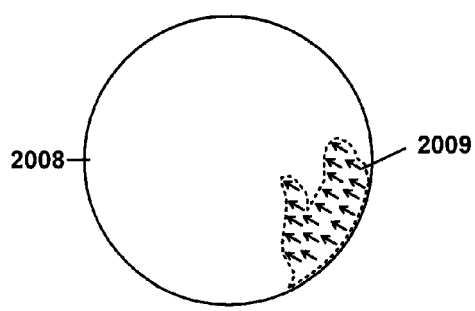

FIG. 20 illustrates an example of a user interacting with a virtual object included in a display image of an application. The portion of the motion history representing the user 2009 and the region 2008, represent the portion of the motion history 1909 and the region 1908 in greater detail. In implementations in which the motion history includes a representation of the direction of motion, such as when the process of detecting an object in an image makes use of optical flow, the average motion of the part 2009 within the region 2008 may be calculated, to generate a motion representative of the part 2009.

Figure 21:
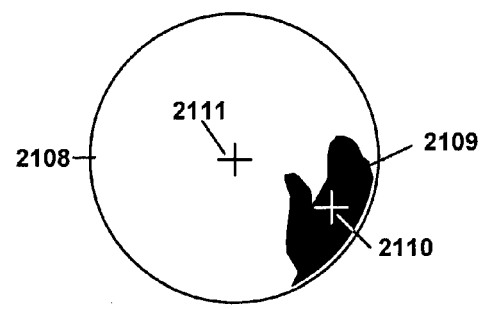

FIG. 21 illustrates an example of centroid processing of a user interacting with a virtual object included in a display image of an application. In some implementations, the application may calculate the centroid 2110 of the part 2109 within the region 2108, and compare that position to the region's centroid 2111. An application may estimate the direction and magnitude of motion within a region 2111, even where optical flow is not used in detecting an object within an image.

Figure 22:
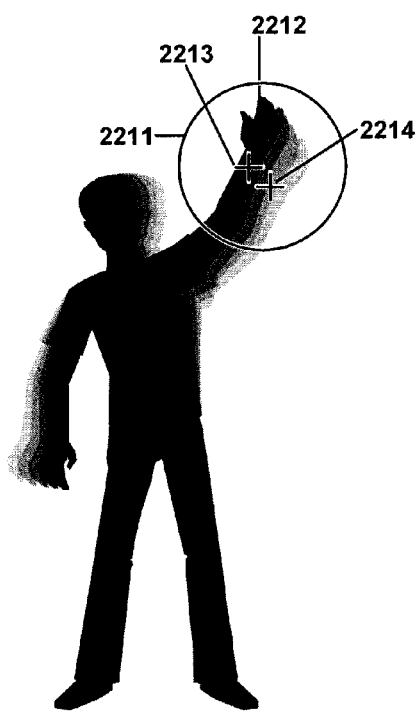

FIG. 22 illustrates an example in which an, application calculates multiple centroids. For instance, a first centroid 2213 of the part 2212 of the motion of the object (e.g., the user) within the region 2211 and having a frame count (or time) more recent than a first predetermined threshold may be determined. In addition, a second centroid 2214 of the part 2212 of the motion of the object (e.g., the user) within the region 2211 and having a frame count (or time) more recent than a second predetermined threshold may be determined. The first threshold includes a short span of time. For example, the first threshold may be the most recent frame. The second threshold includes a longer span of time, so that the path of the second centroid 2214 trails the path of the first centroid 2213. The position of the first centroid 2213 relative to the second centroid 2214 may be considered to be representative motion of the object, (e.g., the user) part 2212.

The second region 2211 may be larger than the first region 2108 described with respect to FIG. 21. An application may detect the presence of the user in a first region 2108 that is coincident to an object in the display image. The application may calculate a second region 2211 that is centered at the centroid 2110 of the part 2109 of the user within the first region 2108. For example, the first region 2108 may be coincident on a "ball" that is displayed in the display image. When the application detects that the user touches the ball, the second region 2211 is used to determine the direction of user motion in which the user has swung at the ball, which in turn may be used to apply a force onto the ball.

An application may use the calculated representative motion of the user part 2109 to determine the magnitude and direction that is applied to the object when it is touched. The object may be a "ball" or a "particle" for example. An application may include many of these "balls" or "particles" that respond to the user.

The application may include a fluid simulation, such as water or smoke. In some implementations, the application maintains a map representing height (e.g., of water ripples) or pressure (e.g., of a gaseous cloud). Map elements corresponding to motion map elements indicating recent user presence at that location are assigned a value. A process propagates that value, generating ripples (e.g., in water) or swirls (e.g., in a gaseous cloud). An application may distort (e.g., warp) a keyed image according to a motion map (e.g., so that the user appears under the surface of the water). An application may further include a velocity map, where the user velocity is calculated by optical flow (or by the process described above for region 2111), and is assigned to the corresponding element in the velocity map.

Many variations of applications are possible. The application may be a video game or an advertisement, however it should be understood that this disclosure is not limited to a video game or an advertisement.

The application may include a data logging process. In some implementations of a data logging process, the presence of a user is determined by comparing the portion (e.g., count of pixels) of the motion history (or object data map) occupied by a user and having a frame count (or time) more recent than a threshold. The presence of the user may be recorded. In other implementations of a data logging process, the count of users is determined by clustering pixels of the motion history (or object data map) occupied by a user and having a frame count (or time) more recent than a threshold. The count of users may be recorded. In further implementations of a data logging process, events (e.g., a transition from the not touched to touched state) may be recorded, the state of the application may be recorded, and/or the display image may be recorded. In some implementations of a data logging process, recording includes storing the data. In other implementations of a data logging process, recording includes transmitting the data over a network (e.g., the Internet).

Referring to FIG. 23, an example of a mapping process may be used in tracking motion history and controlling an application based on the motion history. For example, the pixel values in a motion history may be remapped so that a frame count (or a time) representing a recently detected object causes the image to appear opaque, and the opacity diminishes to transparent as the frame count increases. In this example, FIG. 23 illustrates the relative weight given to a frame count since the object has been detected at a corresponding pixel. As shown, a frame count of zero has a 100% weight (e.g., fully opaque, a frame count of five has a 50% weight (e.g., half the level of opacity of fully opaque), and a frame count of 10 or larger has a 0% weight (e.g., fully transparent). This mapping produces a visual effect whereby an object's motions appear to leave trails.

In some implementations, the remapped pixel information may be used in displaying a representation of an object. As shown in FIG. 16, the remapped pixel information may result in an image based on a motion history that includes varying levels of opacity. In this implementation, the value assigned to a pixel currently occupied by a user is 100%. In aging the data, a value is subtracted, the subtracted value being inversely proportional to the number of frames of persistence. For instance, a user is detected at a pixel position during a first frame, so that pixel value is assigned 100%. In this example, a user is not detected at that pixel position during a second frame, so the pixel value is reduced by 10%, and so forth until it reaches 0%. The value represents an alpha level. However, the count of the number of frames since the user was recently detected at the position may be still be calculated from the value. Using the remapping process to render a display image of a representation of a user may provide an enhanced visual effect such that the representation of the object appears to leave trails when the representation of the object is rendered in a display image associated with an application.

FIGS. 24-28 illustrate examples of interactive systems configured to control an application based on motion history. The systems may be used in performing the process 200 described with respect to FIG. 2.

Figure 24:
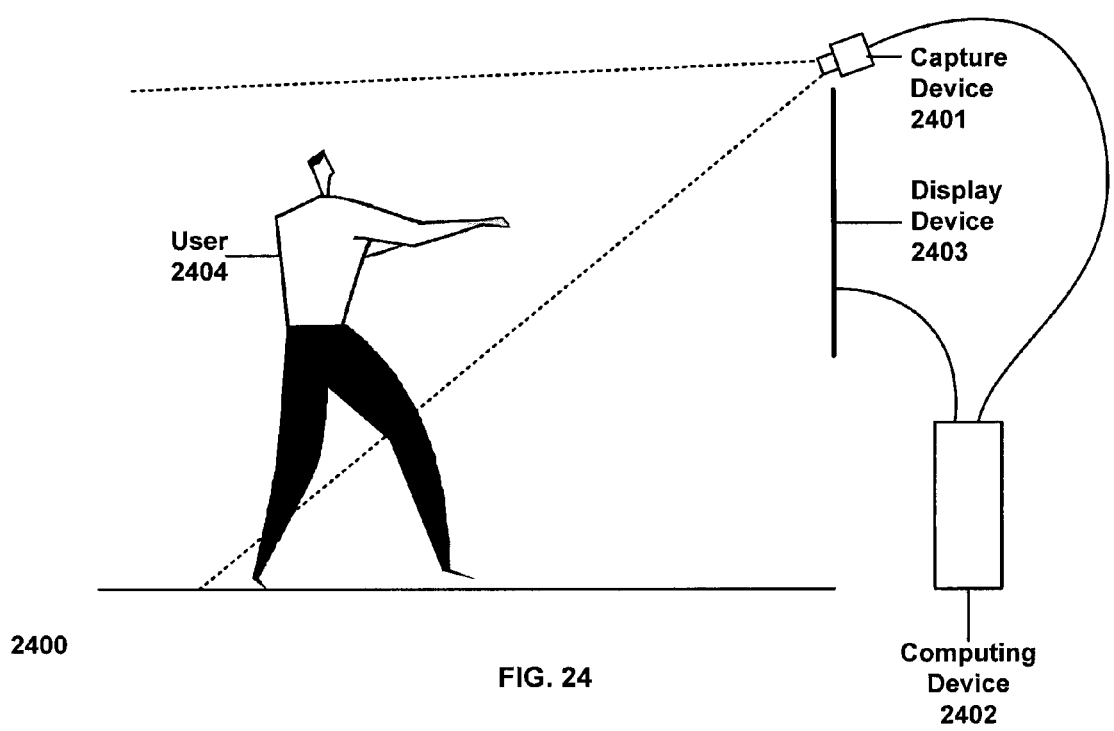
FIGS. 24-28 illustrate examples of interactive systems configured to control an application based on motion history.

FIG. 24 illustrates a system 2400 that includes a display device 2403, a capture device 2401, and a computing device 2402. The display device 2403 displays display images. The display device 2403 may be a projector and projection screen, a plasma display, a liquid crystal CD), an auto-stereoscopic display, or other device capable of displaying computer-generated images. The display device 2403 may include multiple devices arranged to display a display image (for example, a video wall composed of multiple projectors). A user 2404 interacts with the display images on the display device 2403. The capture device 2401 captures images that include the user 2404, or a part of the user. The capture device 2401 may include one or more cameras generating one or more sequences of camera images.

The computing device 2402 processes the images captured by the capture device 2401 to control an application. The application generates a display image that is displayed on the display device 2403. The application may execute on the computing device, or on a separate device. The components of the interactive system 2400 may be arranged in many different configurations. For example, as shown, the capture device 2401 may be positioned above the display device 2403.

Figure 25:
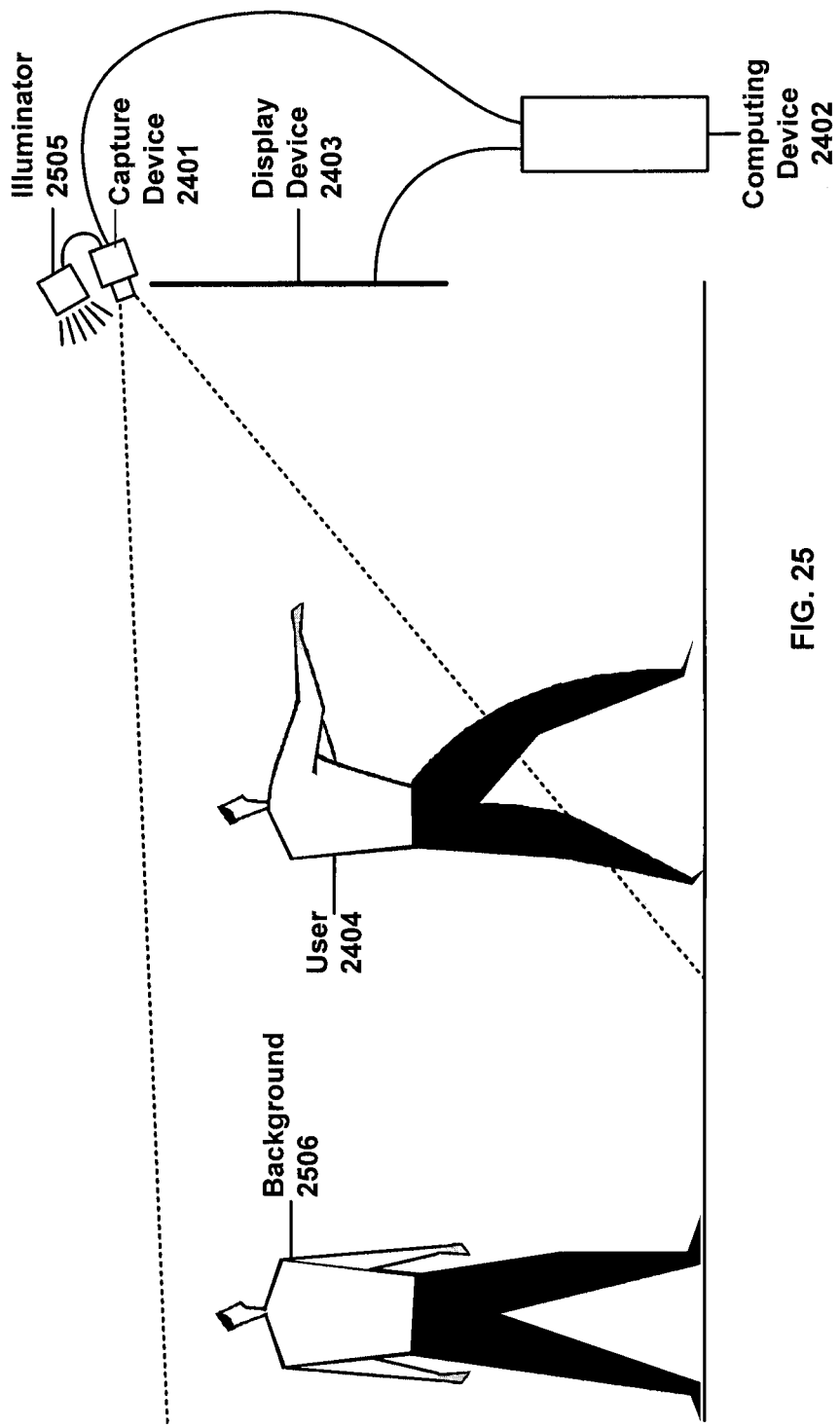

FIG. 25 illustrates an example of an interactive system that includes an illuminator 2505. The illuminator 2505 may illuminate the user 2404 with visible or infrared light. The illuminator 2505 may receive a control signal from the capture device 2401 or the computing 2402. The illuminator 2505 may be positioned above the capture device 2401 and the device 2403. The illuminator 2505 may illuminate the user 2404 greater than people or objects in the background 2506.

Figure 26:
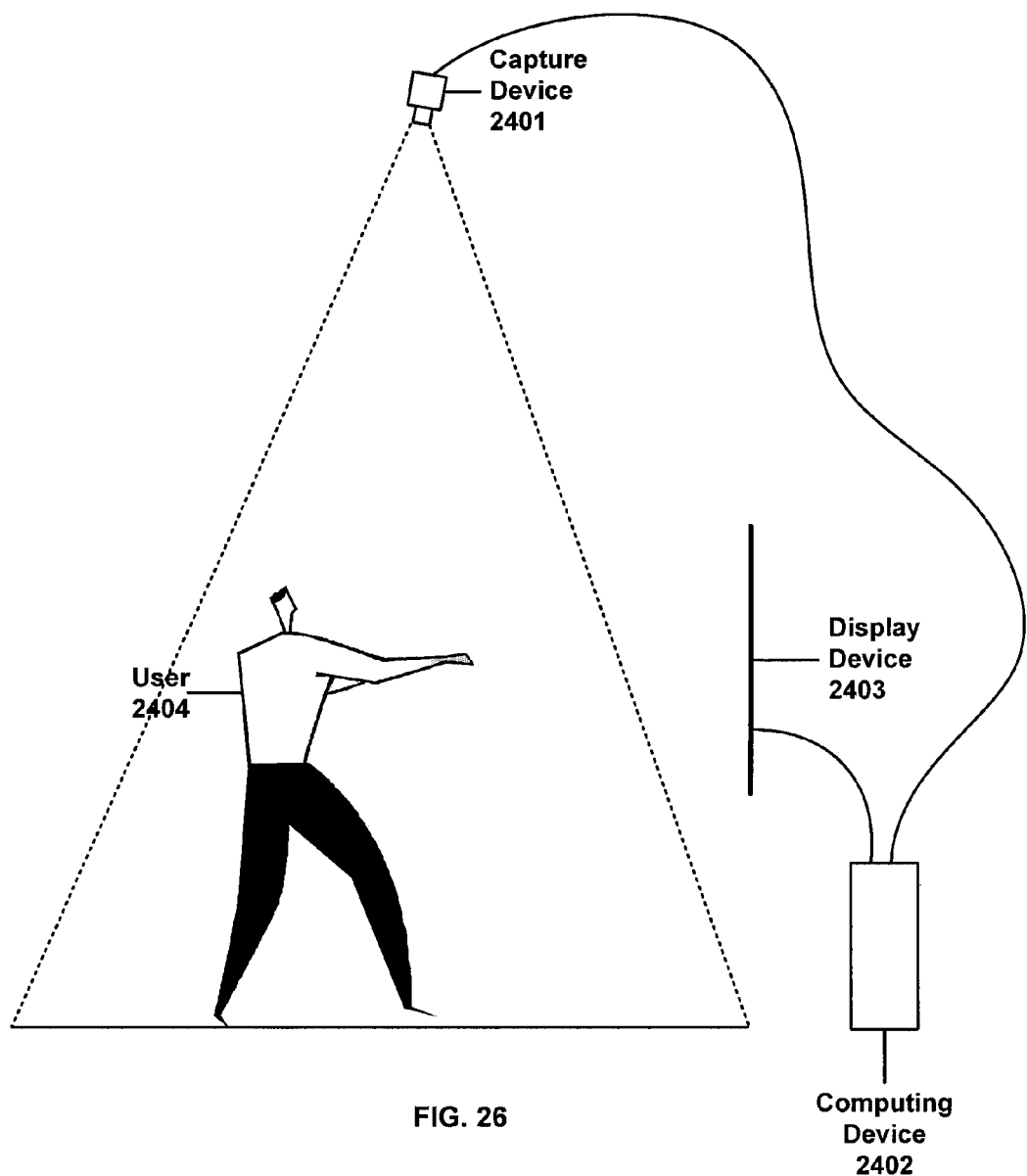

FIG. 26 illustrates a configuration whereby the capture device 2401 is positioned of the user 2404.

Figure 27:
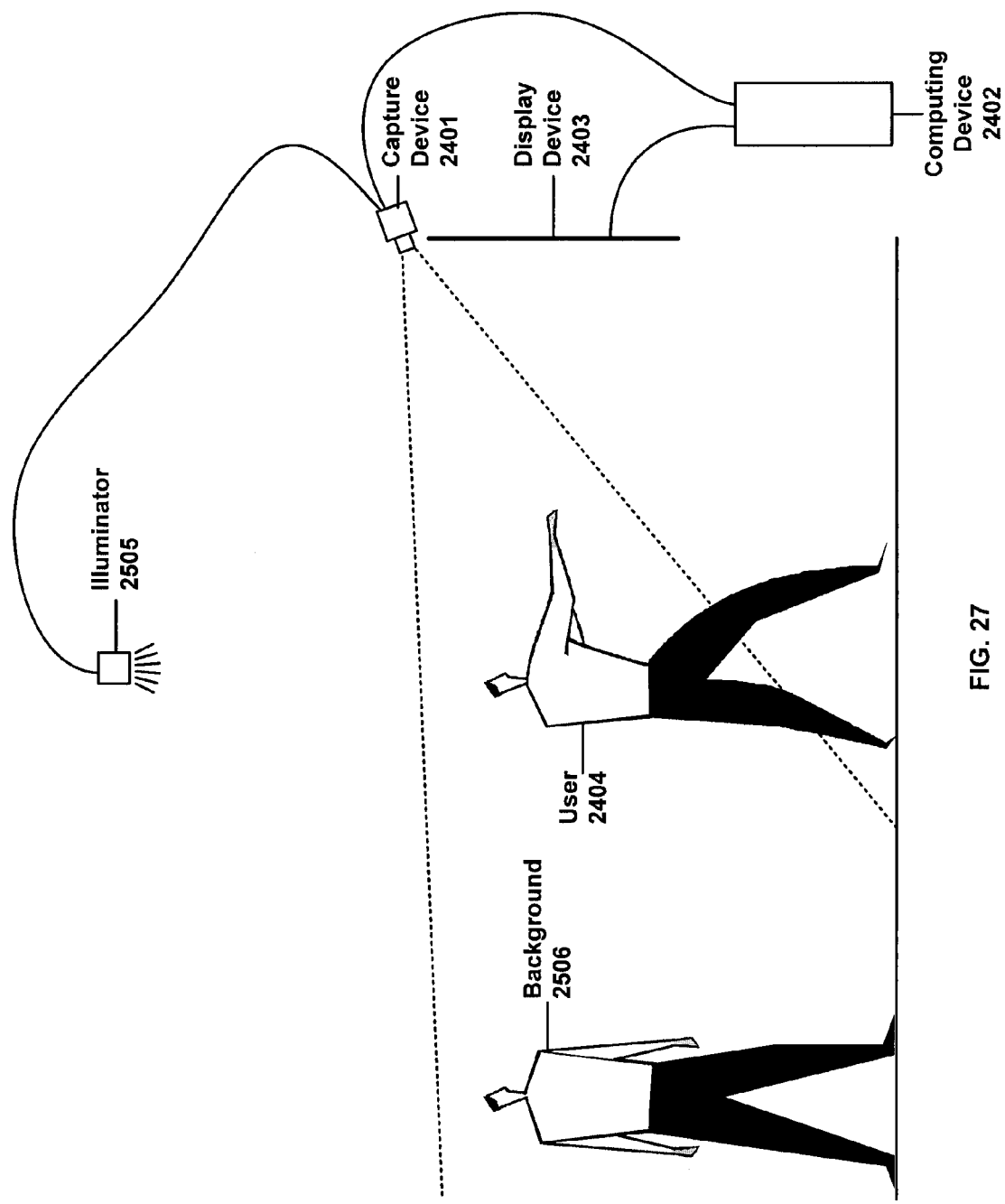

FIG. 27 illustrates configuration whereby the illuminator 2505 illuminates the user 2404 without illuminating other people and objects in the background 2506. FIG. 27 represents a configuration that may be tailored for use with the process 700 described above with respect to FIG. 7.

Figure 28:
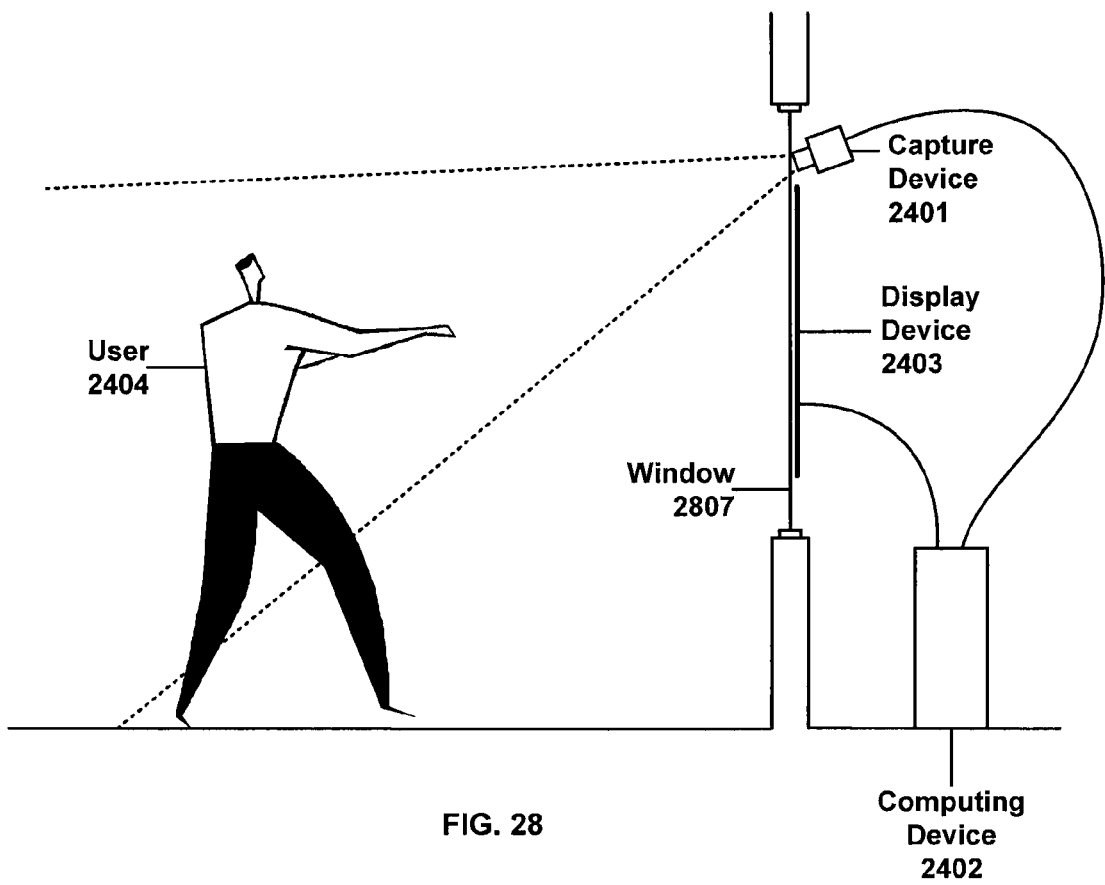

FIG. 28 illustrates a configuration whereby the device is installed within a window 2807. The display device 2403 may be integrated into the window 2807. For example, the display device may be a projector and projection screen where the projection screen includes a film that is affixed to the window 2807. The window 2807 may be a retail store window.

Figure 29:
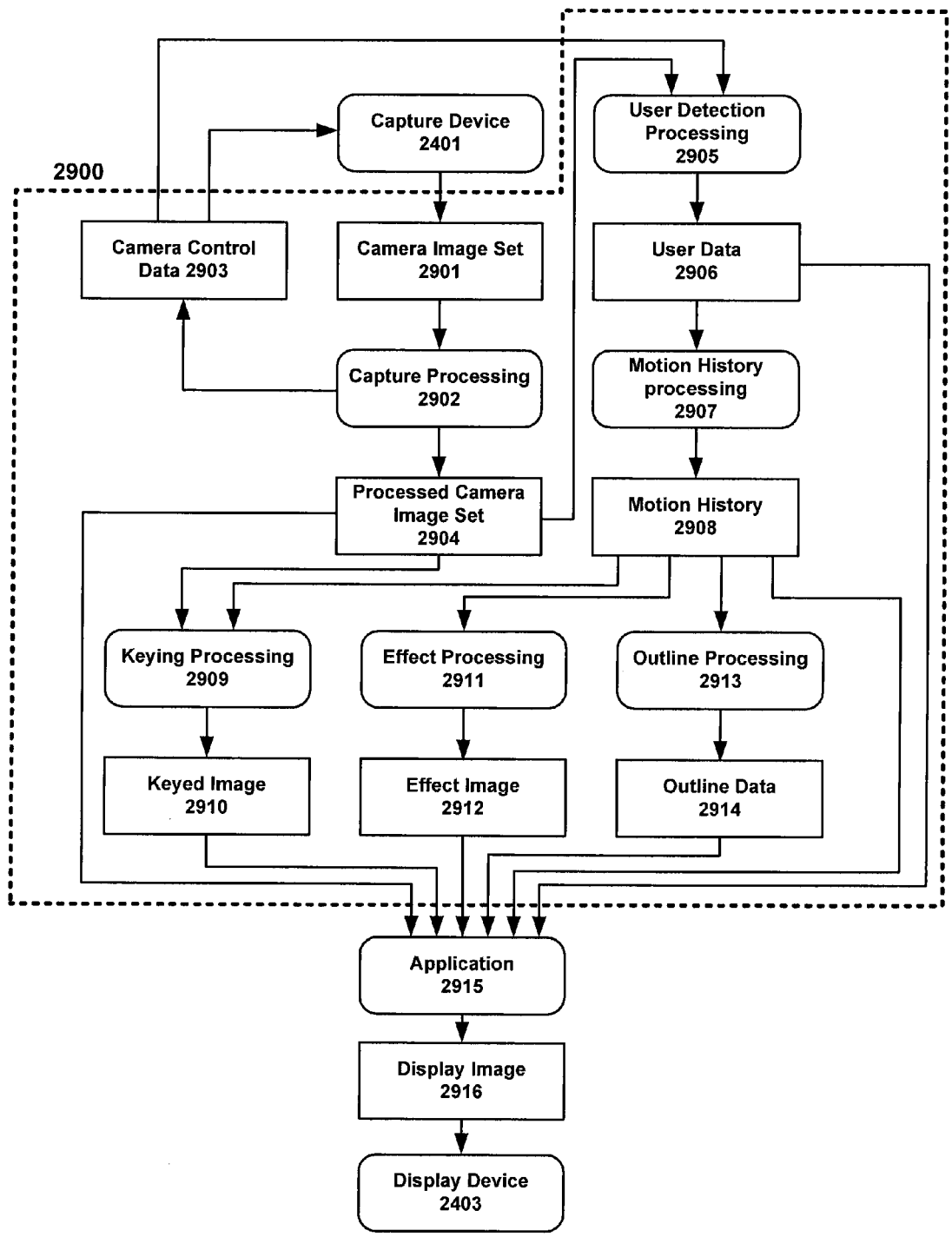
FIG. 29 is a flow chart illustrating an example of a process for controlling an application based on motion history.

Referring to FIG. 29, a process 2900 may be used for determining the motion of the user 2404 and for using the determined motion of the user 2908 as input to an application 2915. Process 2900 may be implemented with a variety of systems including systems described with respect to FIGS. 1 and 24 to 28. For clarity of presentation, process 2900 is described in the context of system 2400, although other systems may be used. The use of system 2400 in describing the implementation of process 2900 is not intended to limit process 2900.

The capture device 2401 captures sequences of image sets (e.g., video). An image set may be part of a sequence of images. For example, the image set may include one or more images taken by one or more capture devices or cameras. The capture device 2401 may include multiple cameras. An image set may include an image produced by each of the multiple cameras.

A capture device 2401 produces a set of camera images 2901. The one or more images included in the camera image set 2901 are processed by a capture processing process 2902, which produces camera control data 2903 and a processed camera image set 2904. A processed camera image set 2904 may be identical to a camera image set 2901 in some implementations. The camera control data 2903 is fed back into the captured device 2401. A user detection process 2905 analyses the processed camera image set 2904, and may also use the camera control data 2903. The user detection process 2905 produces user data 2906.

Process 2900 may further include a motion history process 2907, which processes the user data 2906 to produce a motion history 2908. In some implementations, the motion history process 2907 and motion history 2908 may be a part of the application 2915 and not the process 2900. Process 2900 may further include a keying process 2909, which uses the motion history 2908 (or the user data 2906) and the processed camera image 2904 set (or the camera image set 2901). The keying process 2909 produces a keyed image 2910. In some implementations, the keying process 2909 and keyed, image 2910 may be a part of the application 2915 and not the process 2900.

Process 2900 may further include an effect process 2911, which uses the motion history 2908 (or the user data 2906) and produces an effect image 2912. In some implementations, the effect process 2911 and effect image 2912 may be apart of the application 2915 and not the process 2900. Process 2900 may further include an outline process 2913, which uses the motion history 2908 (or the user data 2906) and produces outline data 2914. In some implementations, the outline process 2913 and outline data 2914 may be a part of the application 2915 and not the process 2900.

An application 2915 may process any of the user data 2906, the motion history 2908, the camera image set 2901, the processed camera image set 2904, the keyed image 2910, the effect image 2912, and the outline data 2914. The application produces a display image 2916 that is played on the display device 2403.

The user detection process 2905 may utilize motion. In many scenarios, a large portion of motion within the image is attributed to the user. The techniques described above with respect to FIGS. 3 to 7 may be used in performing the user detection process 2905.

Capture processing 2901 may include generating camera control data 2903 for controlling the capture device 2401. Camera control data 2903 may affect camera parameters including exposure time, gain, and iris. In one example of this process, the average pixel value within the camera image set 2901, or a part thereof, may be calculated. If the average pixel intensity is lower than a threshold, camera control data 2903 is generated that causes the camera to increase its sensitivity (e.g., image brightness). If the average pixel intensity is higher than a threshold, camera control data 2903 is generated that causes the camera to decrease its sensitivity (e.g., image brightness).

The camera may be adjusted in fine steps that result in a change of sensitivity (e.g., image brightness) that is sufficiently small as not to disrupt the proper operation of the user detection process 2905. In an alternative implementation, a camera's parameters including exposure time, gain, and iris may be determined by an auto-exposure process built into the camera. In this case, the camera control data 2903 may be generated by the capture device 2401.

Camera control data 2903 (e.g., generated by capture processing 2902 or by the capture device 2401) may be transmitted to the user detection process 2905.

The motion history processing 2907 to produce a motion history 2908 may be performed using techniques described above with respect to FIGS. 8 to 11.

A keying process 2909 may combine an image of the processed camera image set 2904 (or the camera image set 2901) with the motion history 2908 (or the user data 2906) to generate a keyed image 2910. The keyed image 2910 includes an alpha channel that determines the opacity of the image as it appears when combined with other graphics generated by the application.

The primary channels of the keyed image 2910 are generated from the processed camera image set 2904 (or the camera image set 2901). The primary channels may be the red, green, and blue color channels, however it should be understood that other color spaces may be used such as YUV. In some implementations, the primary channels of a camera image are copied into the corresponding channels of the keyed image.

In implementations in which the capture device 2401 produces a camera image set that includes multiple camera images (such as implementations of the capture device 2401 that include multiple cameras), a camera image may be selected and copied into the corresponding channels of the keyed image. The selection of camera images is described in the various implementations of the capture device and capture process. In another implementation in which the capture device 2401 produces a camera image set that includes multiple camera images (such as implementations of the capture device 2401 that include multiple cameras), camera images may be combined.

The process of combining camera images may include warping the camera images. Objects may appear at different positions within the multiple camera images. This may occur as a result of the physical alignment of the cameras and the fact that each camera has a slightly different viewpoint (e.g., two cameras may acquire images at the same viewpoint by the use of optics, however this arrangement may be expensive). The warping process remaps the position of pixels, so that objects appear coincident in position in multiple images of the set.

There may be a disparity between the images resulting from the cameras' differing viewpoint, where the disparity varies depending on the distance from the cameras. It may be that the warp process remaps the position of pixels, so that objects at the expected distance of a user appear coincident in position in multiple images of the set.

The process of combining camera images also may include blending the (e.g., warped) camera images. The blending process may average the pixel values of the (e.g., warped) camera images, producing a combined pixel value for each pixel position within the image. The alpha channel of the keyed image 2910 may be generated from the motion history 2908 (or the user data 2906). The motion history 2908 includes pixel values representing a frame count (or time) that the user was detected in that pixel position. Those pixel values are remapped into an alpha value. The process described above with respect to FIG. 23 may be used in mapping pixel values into alpha values.

In some implementations, the motion history 2908 is warped. In some implementations, a different camera may be used to produce the user data 2906 and motion history 2908, than is used in providing the primary (e.g., color) channels of the keyed image 2910. Objects may appear at different positions within the multiple camera images. This may occur as a result of the physical alignment of the cameras (e.g., each camera has a slightly different viewpoint). The warping process may be used to avoid the need to optically-align the viewpoints of the cameras using optics.

The warping process remaps the position of pixels, so that objects appear coincident in position in multiple images of the set. The motion history 2908 may be remapped to be aligned to the image used in providing the primary (e.g., red-green-blue) channels of the keyed image 2910, so that the maximum image quality is maintained. There may be a disparity between the images resulting from the cameras' differing viewpoint, where the disparity varies depending on the distance from the cameras. The warp process remaps the position of pixels, so that objects at the expected distance of a user appear coincident in position in multiple images of the set.

In some implementations, an application 2915 generates a display image 2916 that includes the keyed image 2910. The keyed image 2910 may be combined with images generated by the application. In some implementations, the application 2915 combines the keyed image 2910 with the display image using the alpha channel. An example of a display image including a keyed image was described above with respect to FIG. 17.

In some implementations, an effect process 2911 may be performed that combines an image of a visual effect with the motion history 2908 (or the user data 2906) to generate an effect image 2912. The effect image 2912 includes an alpha channel that determines the opacity of the image as it may appear when combined with other graphics generated by the application. The primary (e.g., red, green, and blue color) channels of the effect image 2912 are generated to produce an animated effect. Examples of animated effects include "plasma" and "water ripples". The animated effects may be generated by a pre-rendered animation sequence, or a particle system. The alpha channel of the effect image 2912 is generated from the motion history 2908 (or the user data 2906) in the same manner as the alpha channel of the keyed image 2910 is generated.

An application 2915 may generate a display image 2916 that includes the effect image 2912, and combine the effect image with application images, in the same manner as the keyed image 2910 is combined and displayed.

In some implementations, an outline process 2913 may be performed. The outline process 2913 generates outline data 2914 that represents the contour of the motion history 2908 (or the user data 2906). The motion history may be generated as a bitmap—a multi-dimensional array of data containing an element for every pixel. The outline data 2914 includes a set of coordinates surrounding the pixels of the motion history 2908 having motion more recent that a predefined threshold (or pixels of user data 2906 classified as part of a user). The outline data 2914 may contain fewer data elements than a bitmap representation, which is advantageous for some applications.

The outline process 2913 may further include a process to reduce the number of data points in the outline data. A process to reduce the number of data points includes removing points that fall within a relatively straight line. The outline process 2913 may further include a process to remove the contours of isolated objects whose size is small. An example of outline data 2914 is illustrated in FIG. 16 described above.

In some implementations, a system includes a camera a display device, and a processor. The processor may process images captured by the camera, control execution of an application (e.g., a computer or video game), and render on the display device, a display image associated with the application. In some examples, the camera captures images of a user interacting with the application (e.g., the computer or video game). In these examples, the camera captures images of the user physically moving in response to display images that are displayed on the display device and associated with the application. The processor may process the images of the user physically moving and detect the position of the user within the images. The processor also may track a motion history of the user's physical motion captured in the images. Tracking the motion history may include dividing the images into multiple portions and tracking the time since the user has been detected in the images at each of the multiple portions. For instance, the processor may maintain a pixel map that stores, for each pixel in the images, information related to the time since the user has been detected at each of the pixels in the pixel map.

In some implementations, the motion history information (e.g., the pixel map) may be used to control an application executed by the processor. For instance, the processor may access the motion history information (e.g., the pixel map) and render, on the display device, a display image associated with the application (e.g., the computer or video game) that includes a representation of the user based on the motion history information. In an example using the pixel map discussed above, the representation of the user displayed in the application may correspond to the time since the user has been detected at each of the pixels. In this example, the representation of the user may include a display of the user with special effects (e.g., smoke or fire) for all pixels at which the user has been detected or may include a display of the user with special effects (e.g., smoke or fire) only for portions of the user's motion that have not been most recently detected (e.g., if the user moves an arm, smoke or fire appears to trail the user's arm as the arm is moved). In some examples, the opacity of pixels displayed in the display image may correspond to the pixel map and fade over time for portions of the images at which the user has not been detected for a period of time (e.g., smoke or a shadow of a user moving his/her arms may fade out as the arm moves away from the location at which the motion began). Other implementations may use the tracked motion history information to control the application in other ways. For instance, the motion history information may be supplied to a particle simulation application such that the particle simulation application may display a representation of the user as an effect image (e.g., smoke, fire, water, etc.) using particle simulation techniques. The motion history information also may be used to determine a user input command for the application.

Figure 30:
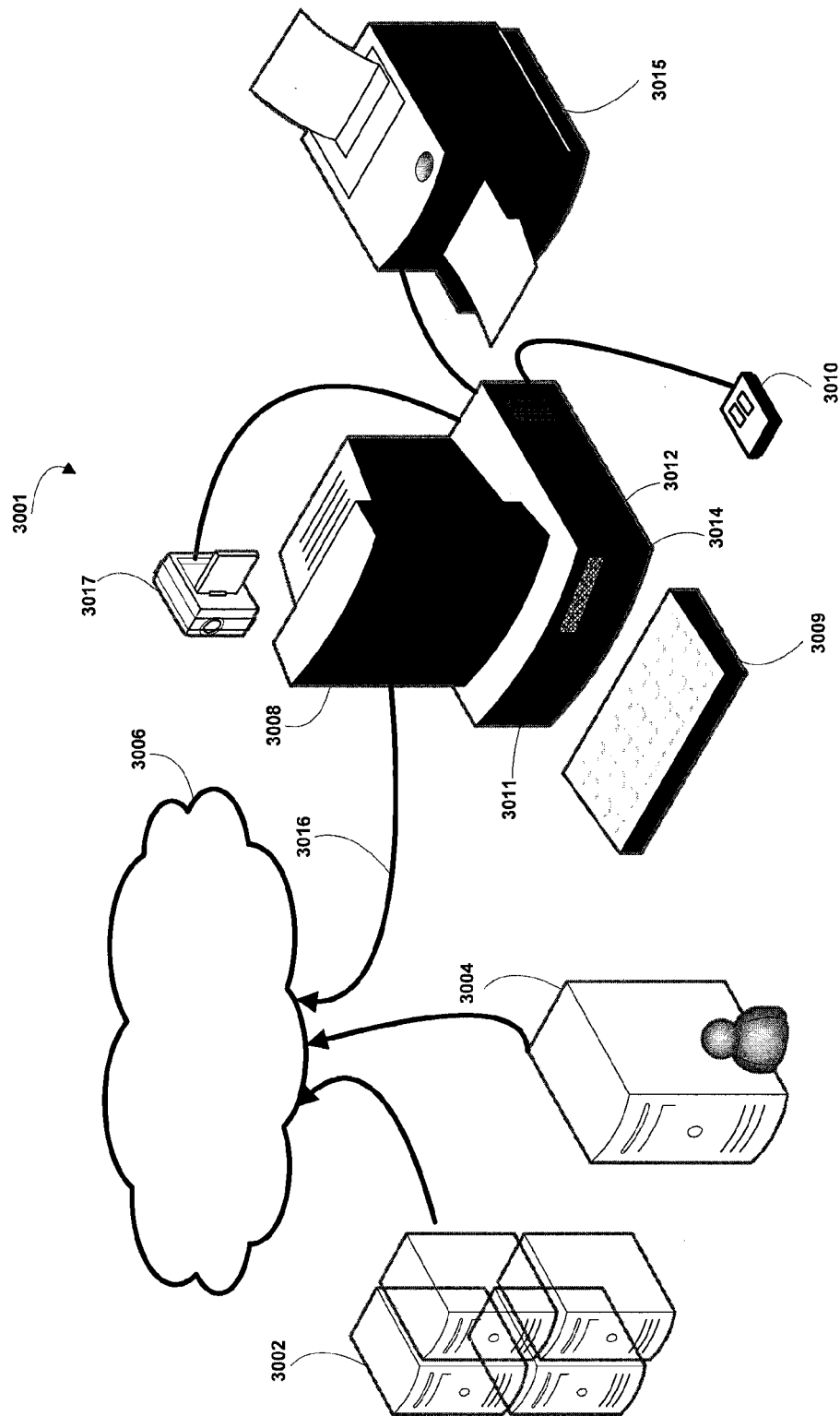
FIG. 30 illustrates the exterior appearance of an exemplary system, according to another general implementation.

FIG. 30 illustrates an example of the exterior appearance of the computing device 2402 or the computing device 140. Briefly, the system 3000 includes a computing device 3001 that includes a processor that controls an application based on a motion history. The device 3001 may exchange electronic communications over a network 3006 with one or more servers including a server 3002 and a server 3004.

In more detail, the hardware environment of the computing device 3001 includes a display monitor 3008 for displaying text and images to a user, a keyboard 3009 for entering text data and user commands into the computing device 3001, a mouse 3010 for pointing, selecting and manipulating objects displayed on the display monitor 3008, a fixed disk drive 3011, a removable disk drive 3012, a tape drive 3014, a hardcopy output device 3015, a computer network connection 3016, and a digital input device 3017.

The display monitor 3008 displays the graphics, images, and text that comprise the user interface for the software applications used by the computing device 3001, as well as the operating, system programs necessary to operate the computing device 3001. A user uses the keyboard 3009 to enter commands and data to operate and control the computer operating system programs as well as the application programs. The mouse 3010 may be any type of pointing device, and may be a joystick, a trackball, a touch-pad, or other pointing device. Software used to provide for manipulation of virtual objects is stored locally on computer readable memory media, such as the fixed disk drive 3011.

In a further implementation, the fixed disk drive 3011 itself may include a number of physical drive units, such as a redundant array of independent disks ("RAID"), or may be a disk drive farm or a disk array that is physically located in a separate computing unit. Such computer readable memory media allow the computing device 3001 to access computer executable process steps, application programs and the like, stored on removable and non-removable memory media.

The computer network connection 3016 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 3006 may be a LAN network, a corporate or government WAN network, the Internet, or other network.

The computer network connection 3016 may be a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE®-1394 FIREWIRE® connector, a Universal Serial Bus ("USB") connector, a serial port connector, a parallel port connector, or other wireline connector.

The removable disk drive 3012 is a removable storage device that is used to off-load data from the computing device 3001 or upload data onto the computing device 3001. The removable disk drive 3012 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive; thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 3011 or on removable media for the removable disk drive 3012.

The tape drive 3014 is a tape storage device that is used to off-load data from the computing device 3001 to upload data onto the computing device 3001. The tape drive 3014 may be a quarter-inch cartridge ("QIC"), 4 mm digital audio tape ("DAT"), 8 mm digital linear tape ("DLT") drive, or other type of tape.

The hardcopy output device 3015 provides an output function for the operating system programs and applications. The hardcopy output device 3015 may be a printer or any output device that produces tangible output objects, including textual or image data or graphical representations of textual or image data. While the hardcopy output device 3015 is depicted as being directly connected to the computing device 3001, it need not be. For instance, the hardcopy output device may be connected to the computing device 3001 via a network interface, such as a wireline or wireless network.

Furthermore, although the computing device 3001 is described above as a desktop PC, in further implementations the computing device 3001 may be a laptop, a workstation, a midrange computer, a mainframe, an embedded system, telephone, a handheld or tablet computer, a PDA, or other type of computer.

Figure 31:
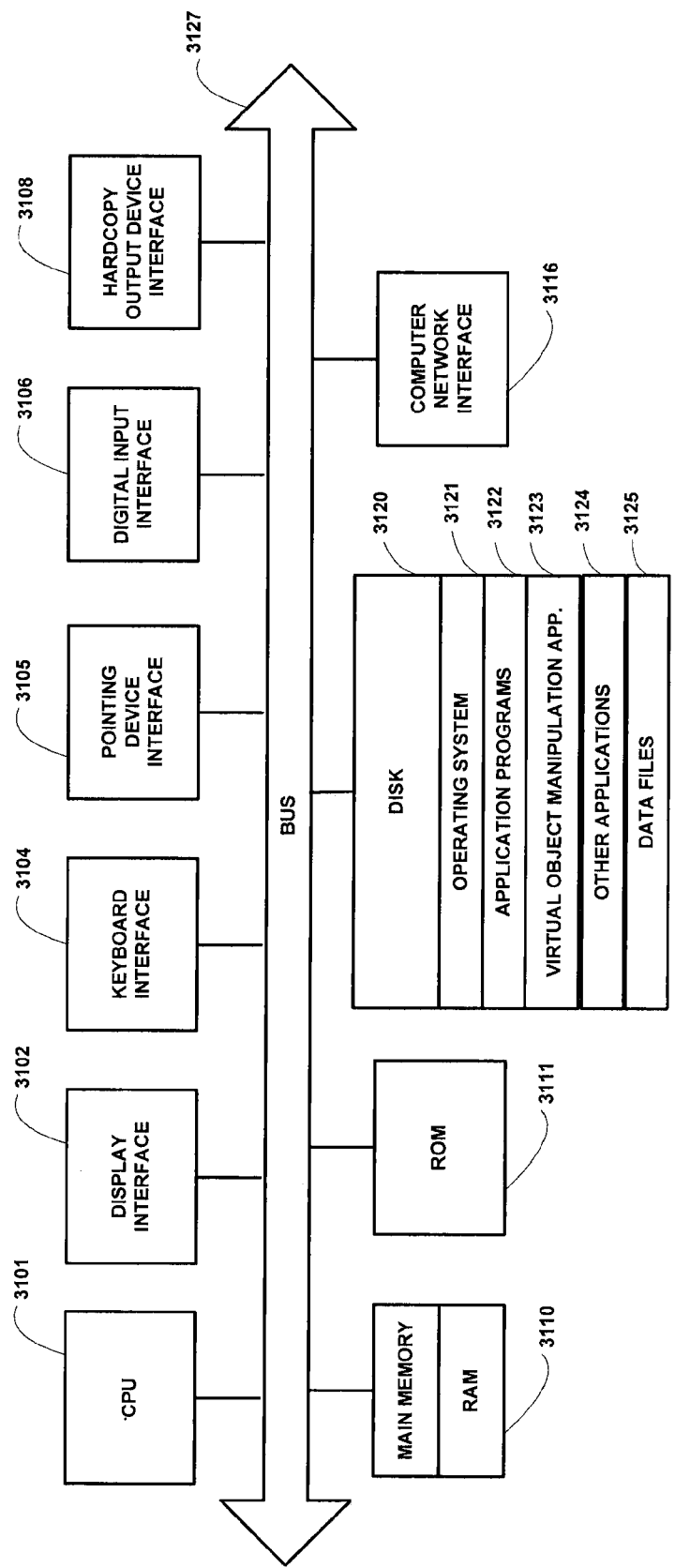
FIG. 31, is a block diagram illustrating the internal architecture of the device shown in FIG. 30.

FIG. 31 is a block diagram illustrating the internal architecture of a computer shown in FIG. 30. An exemplary internal architecture of the computing device 3001 is now described. The computing environment includes a computer central processing unit ("CPU") 3101, where the computer instructions that comprise an operating system or an application are processed; a display interface 3102 which provides a communication interface and processing functions for rendering graphics, images, and texts on the display monitor 3008; a keyboard interface 3104 which provides a communication interface to the keyboard 3009, a pointing device interface 3105 which provides a communication interface to the mouse 3010 or an equivalent pointing device; a digital input interface 3106 which provides a communication interface to the digital input device 3017; a hardcopy output device interface 3108 which provides a communication interface to the hardcopy output device 3015; a random access memory ("RAM") 3110 where computer instructions and data are stored in a volatile memory device for processing by the computer CPU 3101; a read-only memory ("ROM") 3111 where invariant low-level systems code or data for basic system functions such as basic input and output ("I/O"), startup, or reception of keystrokes from the keyboard 3009 are stored in a non-volatile memory device; and a storage 3120 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 3121, application programs 3122 (including the virtual object manipulation application 3123, and other applications 3124 as necessary) and data files 3125 are stored; a computer network interface 3116 which provides a communication interface to the network 3006 over the computer network connection 3016. The constituent devices and the computer CPU 3101 communicate with each other over the computer bus 3127.

The RAM 3110 interfaces with the computer bus 3127 so as to provide quick RAM storage to the computer CPU 3101 during the execution of software programs such as the operating system application programs, and device drivers. More specifically, the computer CPU 3101 loads computer-executable process steps from the fixed disk drive 3011 or other memory media into a field of the RAM 3110 in order to execute software programs. Data is stored in the RAM 3110, where the data is accessed by the computer CPU 3101 during execution.

The computing device 3001 stores computer-executable code for an operating system 312I application programs 3122 such as word processing, spreadsheet, presentation, gaming, or other applications. Although it is possible to provide manipulation of virtual objects using the above-described implementation, it is also possible to implement the functions according to the present disclosure as a dynamic link library ("DLL"), or as a plug in to other application programs such as an Internet web-browser such as the MICROSOFT® Internet Explorer web browser.

The computer CPU 3101 is one of a number of high-performance computer processors, including an INTEL® or AMD® processor, a POWERPC® processor, a MIPS® reduced instruction set computer ("RISC") processor, a SPARC® processor, an ACORN®, RISC Machine ("ARM®") architecture processor, a HP ALPHASERVER® processor or a proprietary computer processor for a mainframe. In an additional arrangement, the computer CPU 3101 is more than one processing unit, including a multiple CPU configuration found in high-performance workstations and servers, or a multiple scalable processing unit found in mainframes.

The operating system 3121 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX®, for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 3121 may be: BINARY RUNTIME ENVIRONMENT FOR WIRELESS® ("BREW®"); Java Platform, Micro Edition ("Java ME") or Java 2 Platform; Micro Edition ("J2ME®"); PYTHON™, FLASH LITE®, or MICROSOFT® .NET Compact.

While FIGS. 30 and 31 illustrate one possible implementation of a computing device that executes program code, or program or process steps, configured to effectuate control of an application based on motion history, other types of computers may also be used as well.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   receiving at least a first image of an object;
   detecting the object in the first image;
   generating an object data map based on detecting the object in the first image, the object data map indicating, for each pixel in the first image, whether the object is detected at the each pixel;
   generating a motion history indicating, for each pixel included in the object data map, an indication of time since the object has been detected at the each pixel; and
   controlling an application based on the motion history,
   wherein controlling an application based on the motion history includes:
      determining whether the object is interacting with a virtual object rendered in a display image associated with the application, based on at least a part of the motion history within a region representing the virtual object;
      calculating a velocity for the virtual object based on the motion history; and
      controlling the application based on the determined velocity for the virtual object;
   wherein the object in the first image and the virtual object rendered in the display image are distinct from each other.

2. The method of claim 1 wherein generating a motion history indicating, for each pixel included in the object data map, an indication of time since the object has been detected at the each pixel includes generating a motion history indicating, for each pixel included in the object data map, an opacity value corresponding to the time since the object has been detected at the each pixel.

3. The method of claim 1 wherein generating a motion history indicating, for each pixel included in the object data map, an indication of time since the object has been detected at the each pixel includes generating a motion history indicating, for each pixel included in the object data map, a number of frames since the object has been detected at the each pixel.

4. The method of claim 1 wherein generating a motion history indicating, for each pixel included in the object data map, an indication of time since the object has been detected at the each pixel includes generating a motion history indicating, for each pixel included in the object data map, a measurement of time since the object has been detected at the each pixel.

5. The method of claim 1 wherein:
generating a motion history indicating, for each pixel included in the object data map, an indication of time since the object has been detected at the each pixel includes filtering the motion history; and
controlling an application based on the motion history includes controlling an application based on the filtered motion history.

6. The method of claim 5 wherein filtering the motion history includes, for each pixel, computing a value for the each pixel based on a value of the each pixel and values of pixels neighboring the each pixel.

7. The method of claim 1 wherein receiving at least a first image of an object includes receiving at least a first image of a user.

8. The method of claim 1 wherein controlling an application based on the motion history includes displaying a representation of the object in the display image associated with the application.

9. The method of claim 8 wherein controlling an application based on the motion history includes controlling movement of the representation of the object in the display image associated with the application.

10. The method of claim 8 wherein displaying a representation of the object in the display image associated with the application includes displaying the representation of the object in the display image associated with the application as one or more particles of a particle system.

11. The method of claim 8 wherein displaying a representation of the object in the display image associated with the application includes:
generating an outline contour representing motion of the object based on the motion history; and
determining whether the representation of the object in the display image touches the virtual object based on the generated outline contour,
wherein the virtual object is rendered in the display image by the application.

12. The method of claim 8 wherein displaying a representation of the object in the display image associated with the application includes displaying a representation of the object such that pixels corresponding to pixels in the motion history at which the indication of time indicates the object has been most recently detected are displayed with an opacity greater than pixels corresponding to pixels in the motion history at which the indication of time indicates the object has been detected further in the past.

13. The method of claim 12 wherein displaying a representation of the object such that pixels corresponding to pixels in the motion history at which the indication of time indicates the object has been most recently detected are displayed with an opacity greater than pixels corresponding to pixels in the motion history at which the indication of time indicates the object has been detected further in the past includes displaying a representation of the object such that pixels corresponding to pixels in the motion history are displayed with an opacity based on the indication of time associated with the pixel.

14. The method of claim 13 wherein displaying a representation of the object such that pixels corresponding to pixels in the motion history are displayed with an opacity based on the indication of time associated with the pixel includes displaying a representation of the object such that a first pixel associated with an indication of time that indicates that the object has been detected more recently at the first pixel than a second pixel appears with an opacity that is greater than an opacity of the second pixel.

15. The method of claim 8 wherein displaying a representation of the object in the display image associated with the application includes:
generating an alpha channel based on the motion history; and
displaying a representation of the object in the display image based on the alpha channel.

16. The method of claim 8 wherein displaying a representation of the object in the display image associated with the application includes displaying an animated effect image based on an animation or a particle system.

17. The method of claim 8 wherein displaying a representation of the object in the display image associated with the application includes displaying a keyed image of the object.

18. The method of claim 8 wherein displaying a representation of the object in the display image associated with the application includes:
controlling the application based on determination results, wherein the virtual object is rendered in the display image by the application.

19. The method of claim 1 wherein:
calculating a velocity for the virtual object includes calculating a velocity and a direction of motion for the virtual object based on optical flow data associated with the motion history; and
controlling the application based on the determined velocity for the virtual object includes controlling the application based on the determined velocity and the determined direction of motion for the virtual object.

20. The method of claim 18, wherein the virtual object comprises a particle of a particle system.

21. The method of claim 1 wherein detecting the object in the first image includes comparing the first image with a background image.

22. A computer-implemented method comprising controlling an application based upon a motion history that indicates, for each pixel included in an object data map, an indication of time since an object has been detected at each pixel, the object data map indicating, for each pixel in a first image received of the object, whether the object is detected at the each pixel, and further based upon determining whether the object touches a virtual object rendered in a display image associated with the application, wherein determining whether the object touches a virtual object rendered in the display image associated with the application is based on identifying that a part of the motion history within a region representing the virtual object is coincident to the virtual object, calculating a velocity for the virtual object based on the motion history; and controlling the application based on the determined velocity for the virtual wherein the object in the first image and the virtual object rendered in the display image are distinct from each other.

23. An apparatus comprising:
a camera configured to capture at least a first image of an object;
a processor;
memory storing instructions that, when executed by the processor, cause the apparatus to:
receive the first image of the object from the camera,
detect the object in the first image,
generate an object data map in response to detecting the object in the first image, the object data map indicating, for each pixel in the first image, whether the object is detected at the each pixel,
generate a motion history indicating, for each pixel included in the object data map, an indication of time since the object has been detected at the each pixel, and
control an application based on the motion history,
wherein controlling an application based on the motion history includes:
determining whether the object is interacting with a virtual object rendered in a display image associated with the application, based on at least a part of the motion history within a region representing the virtual object;
calculating a velocity for the virtual object based on the motion history; and
controlling the application based on the determined velocity for the virtual object;
wherein the object in the first image and the virtual object rendered in the display image are distinct from each other; and
a display configured to render the display image associated with the application.

24. A non-transitory computer readable storage medium having stored thereon instructions that, when executed, cause at least one computing device to:
receive at least a first image of an object;
detect the object in the first image;
generate an object data map in response to detecting the object in the first image, the object data map indicating, for each pixel in the first image, whether the object is detected at the each pixel;
generate a motion history indicating, for each pixel included in the object data map, an indication of time since the object has been detected at the each pixel; and
control an application based on the motion history,
wherein controlling an application based on the motion history includes:
determining whether the object is interacting with a virtual object rendered in a display image associated with the application, based on at least a part of the motion history within a region representing the virtual object;
calculating a velocity for the virtual object based on the motion history; and
controlling the application based on the determined velocity for the virtual object;
wherein the object in the first image and the virtual object rendered in the display image are distinct from each other.

25. A system comprising:
means for receiving at least a first image of an object;
means for detecting the object in the first image;
means for generating an object data map in response to detecting the object in the first image, the object data map indicating, for each pixel in the first image, whether the object is detected at the each pixel;
means for generating a motion history indicating, for each pixel included in the object data map, an indication of time since the object has been detected at the each pixel; and
means for controlling an application based on the motion history,
wherein the means for controlling an application based on the motion history includes:
means for determining whether the object is interacting with a virtual object rendered in a display image associated with the application, based on at least a part of the motion history within a region representing the virtual object;
means for calculating a velocity for the virtual object based on the motion history; and
means for controlling the application based on the determined velocity for the virtual object;
wherein the object in the first image and the virtual object rendered in the display image are distinct from each other.

26. The method of claim 1, wherein controlling an application based on the motion history further includes:
determining a first centroid of a part of the object within a region representing the virtual object having a frame count or time value more recent than a first predetermined threshold;
determining a second centroid of the part of the object within the region having a frame count or time value more recent than a second predetermined threshold, wherein the second threshold includes a longer span of time than the first threshold;
using the relative position of the first centroid to the second centroid as a representative motion of the part; and
using the representative motion of the part to determine a magnitude and direction that is applied to the virtual object.

27. The method of claim 1, wherein determining whether the object is interacting with the virtual object includes determining whether the object is touching the virtual object, based on identifying a part of the object as being coincident to the virtual object.

28. The method of claim 1, further comprising identifying the region representing the virtual object.

29. The method of claim 28, wherein the region represents a boundary shape of the virtual object.

30. The method of claim 28, wherein the region is larger than the virtual object.

31. The method of claim 1, wherein detecting the object in the first image includes classifying the part of the motion history as a part of the object.

32. The method of claim 1, wherein determining whether the object is interacting with the virtual object includes calculating an average motion of the part of the motion history.

33. The method of claim 1, wherein determining whether the object is interacting with the virtual object includes:
calculating a centroid of the part of the motion history; and
comparing the centroid of the part of the motion history with a centroid of the region.

34. The method of claim 1, wherein the first image comprises an image captured by a camera.

35. The method of claim 34, wherein the object comprises a portion of a user or an object manipulated by the user that is within a field of view of the camera.

\* \* \* \* \*